US008446440B2

(12) United States Patent
Elworthy et al.

(10) Patent No.: US 8,446,440 B2
(45) Date of Patent: May 21, 2013

(54) OPTICAL PRINTERS

(75) Inventors: Trevor Elworthy, Coventry (GB);
Duncan Bilson, Coventry (GB);
Nicholas Homan, Coventry (GB)

(73) Assignee: LumeJet Holdings Limited (GB)

( * ) Notice: Subject to any disclaimer, the term of this patent is extended or adjusted under 35 U.S.C. 154(b) by 652 days.

(21) Appl. No.: 12/302,820

(22) PCT Filed: May 30, 2007

(86) PCT No.: PCT/GB2007/002001
§ 371 (c)(1),
(2), (4) Date: Sep. 3, 2009

(87) PCT Pub. No.: WO2007/138318
PCT Pub. Date: Dec. 6, 2007

(65) Prior Publication Data
US 2010/0014064 A1 Jan. 21, 2010

(30) Foreign Application Priority Data

May 30, 2006 (GB) .................................. 0610659.5
Mar. 1, 2007 (GB) .................................. 0704009.0

(51) Int. Cl.
*B41J 2/45* (2006.01)
(52) U.S. Cl.
USPC ............................ 347/132; 347/237; 347/238
(58) Field of Classification Search .................. 347/129, 347/130, 233, 238, 132, 237
See application file for complete search history.

(56) References Cited

U.S. PATENT DOCUMENTS

| 5,592,205 | A | 1/1997 | Shimizu et al. |
| 2004/0145546 | A1 | 7/2004 | Hyuga |
| 2005/0007441 | A1 | 1/2005 | Hyuga |
| 2006/0050133 | A1 | 3/2006 | Kokubo |

FOREIGN PATENT DOCUMENTS

EP 1228 633 B1 3/2004

OTHER PUBLICATIONS

European Patent Office, PCT Application No. GB2007/002001 International Search Report.
European Patent Office, PCT Application No. GB2007/002001 Written Opinion.

*Primary Examiner* — Huan Tran
(74) *Attorney, Agent, or Firm* — Schwegman Lundberg & Woessner, P.A.

(57) ABSTRACT

One aspect of this invention relates to an illumination device for an optical printer, the illumination device comprising: a first array of light sources comprising a plurality of light source elements that are each operable to emit light within a red band of the visible electromagnetic spectrum; a second array of light sources comprising a plurality of light source elements that are each operable to emit light within a blue band of the visible electromagnetic spectrum; and a third array of light sources comprising a plurality of light source elements that are each operable to emit light within a green band of the visible electromagnetic spectrum; wherein said first, second and third arrays of light sources are generally linearly arranged along respective substantially parallel notional lines on a substrate; and said plurality of light source elements of each said array are arranged such that respective adjacent light source elements of said plurality are offset from one another with respect to the associated notional line.

19 Claims, 11 Drawing Sheets

Fig. 1
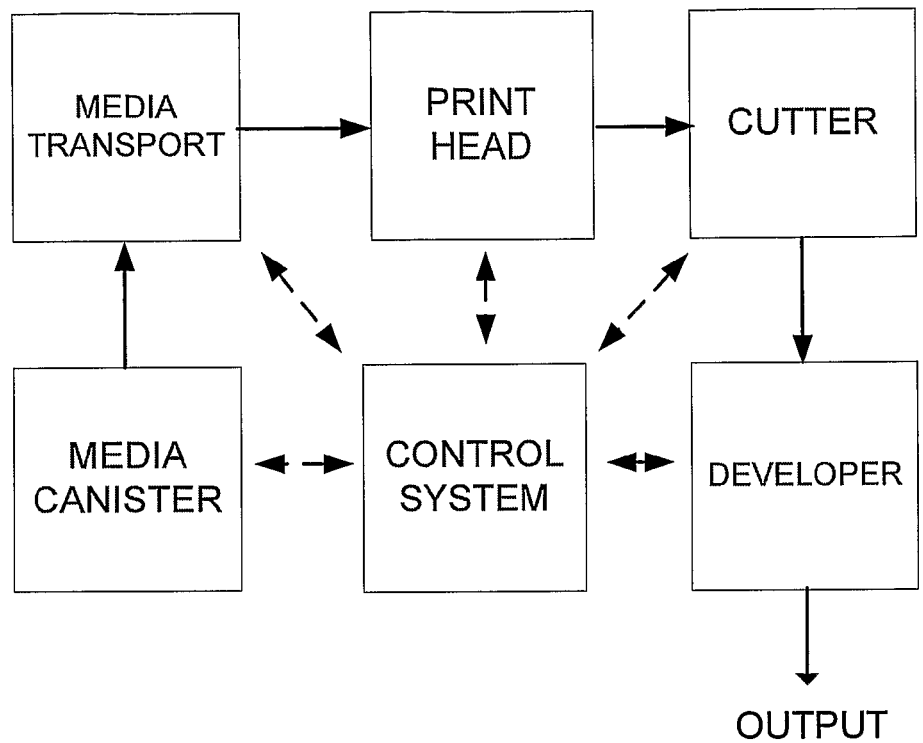
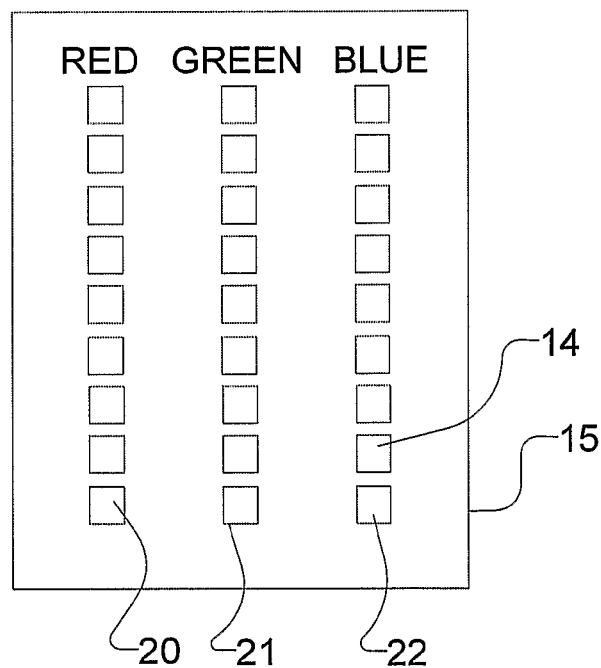
Fig. 2(a)

OPTICAL PRINTERS

FIELD OF THE INVENTION

In general terms, this invention relates to improvements to optical printers. Some of the preferred embodiments described hereafter in detail relate to an illumination device for an optical printer. Other embodiments relate to a printing head for an optical printer, and to a printing head assembly for an optical printer.

Additional embodiments are concerned with calibration of an optical printer, further embodiments relate to a transport mechanism for an optical printer. An optical printer incorporating one or more of these arrangements is also disclosed.

BACKGROUND TO THE INVENTION

An optical printer is a device that can convert a digitally stored image into light, and can project this light onto a light-sensitive medium to generate an image. Optical printers were originally used to form photoresist masks for electronic circuit boards, and were relatively easy to manufacture as the optical exposure was either "on" or "off".

The variant of optical printer described in this patent is predominantly designed for producing photographic-style images, although the teachings of the present invention are not limited to the production of photographic-style images.

Optical printers are distinct from laser-printers and inkjet printers as they do not deposit material (toner in the case of laser-printers and ink in the case of ink-jet printers) onto the medium, instead exposing the medium to light, which is subsequently chemically processed. Whilst the name "printer" is therefore something of a misnomer (in that such devices do not actually "print", in the conventional sense of the word, anything onto the medium), devices of the type described herein are commonly known in the art as printers.

Photographic images are usually considered to be of a higher quality than ink- or laser-jet images, as photographic medium (e.g. photographic paper) has the capability to vary the intensity of each pixel in the image. Ink or laser-jet printers deposit material that is either there, or isn't. Consequently, the apparent resolution of an ink- or laser-jet printer (in dots-per-inch, or DPI) needs to be significantly higher than that of a photo-printer to achieve similar quality.

Several styles of optical photographic printer are commercially available, and use a variety of optical exposure mechanisms, including lasers, liquid-crystal masks, micro-mirrors and light-emitting diodes.

FIG. 1 is a schematic illustration of the typical components of an optical printer. As shown, the printer comprises a media canister from which a continuous length of unexposed photographic media (such as photographic paper) is drawn. The media is drawn from the canister by precision mechatronics, the media transporter, which provides media to the print head and positions the media with respect thereto. The print head comprises a plurality of optical elements (such as light emitting diodes) that can be energised to generate light which exposes the region of the media located immediately underneath the print head.

The print head is moved over the media to expose the media in swathes, and data is fed to the print head by a control system which arranges for the correct combination of elements to be energised to expose the media in such a way that the media is exposed with a desired final image.

Once the media has been exposed it is passed through the cutter by the media transporter and the cutter is operated to cut the exposed section of media from the remaining unexposed length of media. The exposed length of media is then passed to a chemical developer for developing. The developing process reveals the image on the media, and the finished printed image is output.

As shown, each of the elements of the system is carefully controlled by a control system. The control system may comprise a personal computer running appropriate software, purpose-built electronic circuits or a combination of the two.

For all printers, a key point of concern is the resolution at which the printer can print and much work has been done, particularly in the field of ink jet printing, to improve the number of dots per inch that can be printed on a substrate (typically paper). In an optical printer a key limiting factor for the achievable resolution is the size of the illumination device used to generate the light that impinges on the photographic medium.

Our previous patent (European Patent No. 1228633) discloses an illumination device (depicted in FIGS. 2(a) and 2(b) hereafter) that comprises three arrays of LED (light emitting diode) illumination elements 14—one column of red LEDs 20, one column of green LEDs 21 and one column of blue LEDs 22—mounted on a substrate 15. The illumination device is arranged to emit light, when energised, towards a light receiving face 13 of a tapered optic fibre light pipe 10. The light pipe conveys the light received from the LEDs at the light receiving face to a light emitting face (not shown) which has a smaller surface area that the light receiving face. Light emitted by the light emitting face then impinges on a photographic medium (such as photographic paper) to generate an image. As depicted in FIG. 2(a) the LEDs are mounted on the substrate in parallel columns, and (as shown in FIG. 2(b)) the LEDs of each respective column are spaced from adjacent LEDs to enable the necessary electrical connections to be made.

Tapering the optic fibre light pipe in the manner described in this patent reduces the size of the illuminated "spot" generated by the illumination device on the photographic medium (as compared to that which would otherwise be produced were the illumination device to directly illuminate the photographic medium), thereby enabling the optical resolution of the resulting photographic image to be increased.

Whilst this arrangement has greatly increased the resolution that was previously achievable with previous optical printers, there is a desire in the market for higher resolution images and to respond to this market need we have attempted to further improve the achievable resolution by reducing yet further the physical size of the illumination device. However, we have found that our attempts to reduce the physical size of the illumination device have been hampered inter alia by the physical size of the—typically LED—light emitting elements of the red, green and blue arrays that make up the illumination device, and the spacing between the elements that must be provided to enable the elements to be connected to an electrical power source.

A first aspect of the present invention seeks to address this technical problem of how to reduce the size of the illumination device given the constraints of the minimum physical size of the light emitting elements, and the space that must be provided to enable those elements to be coupled to a source of power.

A second aspect of the present invention is concerned with addressing issues concerning the quality of the printed image, in particular the quality of the image as perceived by the human eye.

With previously proposed devices, such as that disclosed in our prior patent, we have noticed that the quality of the image can sometimes be adversely affected by a so-called "banding"

effect that can occur at the junction between successive printing swathes as the image is being formed on the photographic medium.

As is illustrated schematically in FIG. 2(c), photographic medium 1 (typically comprising a roll of photographic paper) is transported through the printing apparatus in a direction A, and the illumination device 3 (consisting of red, green and blue light emitting element arrays 5) is moved from point B to point C to illuminate a swathe of the photographic medium immediately below the device and generate part of the final image. Light from the elements, as previously described, impinges on the light receiving face of a tapered light pipe provided between the illumination device and the photographic medium 1 (hence the light pipe is not visible in FIG. 2(c)), and exits from the light pipe via a light transmitting face that is considerably smaller than the light receiving face to thereby illuminate an area of the photographic medium that is much less than that which would otherwise be illuminated were the arrays to directly illuminate the photographic medium. The illumination device then returns from point C to point B, the photographic medium is advanced by a distance X that is substantially equal to the length of the aforementioned light emitting face of the tapered light pipe (and smaller than the length of the illumination device), and the illumination device is then moved from point B to point C to print to print the next swathe of the image.

Whilst this arrangement works well, apparently insignificant errors in the amount paper advanced between the printing of successive swathes, and other operational irregularities, can detrimentally affect the final image. For example, advancing the paper by a length greater than X can cause a detectable gap (visible as a white line) between successive swathes, whereas advancing the paper by a length less than X can result in an overexposure of the photographic medium (visible as a noticeably darker band) in the region where the swathes overlap.

The aforementioned second aspect of the present invention seeks to address this technical problem of how to improve the quality of the printed image, in particular the quality of the image as perceived by the human eye (particularly, but not exclusively, to reduce the impact of the above described "banding" effect).

A third aspect of the present invention is concerned with the structure of the illumination device, and the printing head incorporating that device.

Our previously proposed illumination device is essentially as depicted in FIG. 2(b), and comprises a substrate 15 on which the individual light emitting elements 14 are mounted. The substrate is then encapsulated within a transparent layer 33 to protect the LEDs and the electrical connections 34 thereto. The illumination device is spaced from the tapered optic fibre light pipe 10, and an anti reflection layer 32 may be added to the transparent layer or to the light receiving face 13 of the light pipe 10.

Whilst this previously proposed illumination device has functioned adequately, we have noted that the quality of the final image can sometimes be adversely affected by crosstalk between adjacent LED elements, and by variations in the relative intensities of the red, green and blue arrays. It is also the case that maintenance of the gap between the illumination device and fibre optic light pipe must be carefully controlled (to avoid aberrations in the final image) and such control can be difficult to achieve in practice.

The third aspect of the present invention seeks to address such problems.

A fourth aspect of the present invention is concerned with calibration of the optical printer so as to improve the quality of the final image.

A persistent problem for optical printers, particularly those printers that use LEDs for light sources, is that the characteristics of the light sources vary dramatically from one to the other. For example, for any two LEDs of a particular colour both the intensity profile and wavelength profile of the light emitted by the LEDs, when driven by the same current, will vary considerably. These variations from one LED to another can show up as lines within swathes of a final printed image. It is also the case that light emitting diodes tend to vary non-linearly in both their output intensity and wavelength with input voltage variations, and a compounding problem is that the photographic medium (typically photographic paper) used for a particular print will directly affect the quality of that print and, furthermore, the characteristics of a given photographic paper will typically be quite different from those of another type of paper.

All of these different variations must be addressed if the quality of the final image is to be improved, and to this end it has previously been postulated that one could employ a series of photocells as a photographic medium, and feed back the output of those photocells to the light source elements to adjust the output of those elements and hence provide a uniform illumination of the paper.

However, whilst this would appear at first sight to be an attractive means of mitigating such problems, it is unfortunately the case that photocells respond very differently to photographic medium, such as photographic paper, and as such adjusting the system to be best suited for a set of photocells will not necessarily provide an appropriate setting for printing on photographic paper.

The fourth aspect of the present invention addresses these problems, and in general terms relates to the concept of calibrating a printer from one or more processed images printed with that printer. This approach is advantageous as the image will of course incorporate any of the aforementioned variations, and as such by calibrating to the image one inevitably addresses any such variations.

A fifth aspect of the present invention is concerned with improving the transport mechanism for the photographic medium.

A particular requirement of that transport mechanism is that to enable the printer to achieve a high resolution and to provide a high quality output, the components of the transport mechanism must be carefully designed and controlled to enable photographic medium movement with a tolerance of in the region of a few microns, typically roughly four microns. By this we mean that when it is desired to move the photographic medium a given distance through the printer, then the mechatronics of the transport mechanism must be such that the actual transport distance is within plus or minus up to a few microns (e.g. four microns) of the desired distance.

As will no doubt be appreciated by persons skilled in the art, if the actual transport distance should be greater than the desired distance then visible white bands may be produced in the final image. Similarly, if the transport distance should be less than the desired distance by more than four microns, then adjacent swathes of the image will overlap to a noticeable degree and the final image will be spoiled. It is critical, therefore, that the transport mechanism design is such that highly accurate photographic medium transport is enabled, and a fifth aspect of the present invention addresses this problem.

A sixth aspect of the present invention also relates to the transport of photographic medium through an optical printer.

This aspect of the present invention relates to the fact that we have identified that it would be advantageous if a printer could be devised that provided a greater throughput of photographic medium. It would also be advantageous if such a printer could readily accommodate photographic medium of different sizes.

One relatively simple way to increase photographic medium throughput would be to increase the speed at which the optical head assembly travels over the photographic medium, however such an approach would not provide that great an increase in speed as the head must be over a given point on the photographic medium for a fixed minimum amount of time (for a given photographic medium and a given light output from the light source) to expose that point to the requisite amount of optical energy required to generate the image, and hence it is impossible—without adversely affecting the quality of the final image—to increase the speed of the head to a point where it is over a given point of the photographic medium for less than this fixed minimum period of time.

The sixth aspect of the present invention addresses these problems.

SUMMARY

It is an object of aspects of the present invention to address one or more of the aforementioned problems.

To this end a first aspect of the present invention provides an illumination device for an optical printer, the illumination device comprising: a first array of light sources comprising a plurality of light source elements that are each operable to emit light within a red band of the visible electromagnetic spectrum, a second array of light sources comprising a plurality of light source elements that are each operable to emit light within a blue band of the visible electromagnetic spectrum; and a third array of light sources comprising a plurality of light source elements that are each operable to emit light within a green band of the visible electromagnetic spectrum; wherein said first, second and third arrays of light sources are generally linearly arranged along respective substantially parallel notional lines on a substrate; and said plurality of light source elements of each said array are arranged such that respective adjacent light source elements of said plurality are offset from one another with respect to the associated notional line.

By arranging the light source arrays along notional parallel lines on the substrate, and offsetting the individual elements of each array with respect to the associated notional line—in effect by providing arrays of castellated light emitting elements—it is possible to more closely arrange the light emitting elements in a dimension parallel to the aforementioned notional lines than it is in the prior art arrangement depicted in FIG. 2(a). By more closely arranging the elements in this way the spacing of individual components of the final image that are attributable to respective elements can be reduced, thereby improving the resolution of that image.

In one particularly preferred arrangement, the offset of each element with respect to the associated notional line on the substrate is arranged such that the emission profiles of adjacent elements in each array overlap to such a degree that elements of an image printed by the optical printer on a photographic medium and attributable to adjacent LED elements are not readily be resolved (for example without magnification).

A second aspect of the present invention provides an illumination device for an optical printer, the illumination device comprising: a first array of light sources comprising a plurality of light source elements that are each operable to emit light within a red band of the visible electromagnetic spectrum, a second array of light sources comprising a plurality of light source elements that are each operable to emit light within a blue band of the visible electromagnetic spectrum; and a third array of light sources comprising a plurality of light source elements that are each operable to emit light within a green band of the visible electromagnetic spectrum; wherein said first, second and third arrays of light sources are generally linearly arranged along respective substantially parallel notional lines on a substrate; said first, second and third arrays of light sources are each operable to emit a strip of light, and said printing head is configured such that a first of said arrays of light sources emits a strip of light when energised that is linearly offset along the associated notional line from a strip of light that is emitted when a second adjacent one of said arrays of light sources is energised.

By adopting this arrangement, a join between adjacent components of the final image resulting from illumination of the photographic medium by the red array (say) occurs at a different location on the photographic medium to joins between adjacent components of that image which are attributable to the green and blue arrays. By virtue of this arrangement, junctions between components of the final image attributable to one of the three arrays, will never coincide with junctions between components attributable to the other two arrays.

In effect, by adopting such an arrangement errors at junctions between image swathes for the three arrays are not compounded (as they were in the device disclosed in the abovementioned patent), and as such for one of the arrays an error occurring at a junction between image swathes attributable to that array occurs at a point where there should be no errors in the components attributable to the other arrays and hence such errors are less perceptible to the human eye than they would be if all three arrays were aligned.

A third aspect of the present invention provides an illumination device for an optical printer, the illumination device comprising: a first array of light sources comprising a plurality of light source elements that are each operable to emit light within a red band of the visible electromagnetic spectrum, a second array of light sources comprising a plurality of light source elements that are each operable to emit light within a blue band of the visible electromagnetic spectrum; and a third array of light sources comprising a plurality of light source elements that are each operable to emit light within a green band of the visible electromagnetic spectrum; a substrate having a first surface on which said first, second and third light source arrays are mounted, said first surface being configured to reduce light reflection between adjacent arrays of light source elements; and (optionally) a mask located in front of said arrays of light source elements, the mask having a plurality of apertures provided therein, said apertures being arranged so as to be generally coincident with the light source elements of said arrays to permit light to travel through the mask.

This aspect of the present invention is advantageous because the first surface of the substrate reduces cross-talk between adjacent arrays, and the mask reduces cross-talk between adjacent elements of an array and between elements of adjacent arrays. By this we mean that, for a given element, a greater component of the light coming from that part of the array (which light illuminates a group of fibres in the taper) is actually attributable to that element (as opposed to being light reflected from adjacent elements or arrays).

A fourth aspect of the present invention provides a method of calibrating an optical printer having a plurality of light source arrays each comprising a plurality of light source elements, the method comprising: (a) controlling the printer to print a predetermined test pattern onto a first photographic medium; (b) electronically scanning and digitising the test pattern printed onto said first photographic medium; (c) processing said digitised printed test pattern to determine for each said light source element of the plurality of arrays, a measure of the intensity of light emitted by that element; (d) determining for each said light source element an adjustment factor by which the light output of that element should be adjusted if all elements of the array of which that element forms part are to have substantially the same light output; (e) populating a calibration table with said adjustment factors; (f) controlling the printer to adjust the light output of each of the light source elements of the arrays by the corresponding adjustment factor indicated in the calibration table; (g) operating the printer to reprint the predetermined test pattern onto a second photographic medium identical to the first; and (h) iteratively repeating steps (a) to (g) until the predetermined test pattern printed onto the photographic medium meets a predetermined set of criteria and is determined to be of acceptable quality A fifth aspect of the present invention provides a transport mechanism for an optical printer, the mechanism comprising: a transport roller for transporting photographic medium, at least one region of the exterior surface of the transport roller being configured to grip and drag photographic medium through the transport mechanism and towards a printing head assembly; a pressure roller configured to press photographic medium against the transport roller to thereby reduce the possibility of the medium slipping as it is advanced by the transport roller; guide means for guiding photographic medium from at least one storage canister to the pressure roller and transport roller; a stepper motor configured to rotate the transport roller; means for detecting rotation of the transport roller and generating a signal that is representative thereof; and a controller that is configured to control the stepper motor to drive the transport roller to advance medium a predetermined distance through the transport mechanism, to derive from said signal a measure of the distance rotated by the roller, and to control the stepper motor to cease rotation of the roller when the measured distance is equal to said predetermined distance.

In one embodiment, a sixth aspect of the present invention provides a component for an optical printer, which component is configured and arranged to define a plurality of printing channels through each of which discrete lengths of media may be passed for exposure by an optical light source, the component being configurable so that discrete lengths of media may be passed through more than one of said channels for exposure by said light source to enable the formation of an image on each length of media, or so that a single length of media may be passed simultaneously through more than one of said channels for exposure by said light source to enable the formation of a single image on said single length of media.

In another embodiment, the sixth aspect of the present invention provides a component for an optical printer, which component has at least two printing channels through which discrete lengths of media may simultaneously be passed, and at least one optical printing head configured to expose lengths of media in each said channel in one printing pass and thereby enable the formation of an image on each length of media.

Another aspect of the present invention relates to an illumination device for an optical printer, the illumination device comprising respective arrays of red, green and blue illumination elements that are each arranged along respective notional parallel lines on a substrate so as to be linearly offset from one another along their respective notional lines, the arrangement being such that in the event of a swathe overlap when the device is operated to expose adjacent swathes of a photographic medium, the respective regions of the photographic medium that are overexposed by each of the arrays as a result of said overlap do not coincide with another.

Yet another aspect of the present invention relates to an illumination device for an optical printer, the illumination device comprising respective arrays of red, green and blue illumination elements that are each arranged along respective notional parallel lines on a substrate so as to be linearly offset from one another along their respective notional lines, the arrangement being such that in the event of a gap between swathes when the device is operated to expose adjacent swathes of a photographic medium, a first region of the photographic medium where a gap exists between regions of the photographic medium that have been exposed by any one of the arrays does not coincide with second and third regions of the photographic medium where a gap exists between respective regions of the photographic medium that have been exposed by the other arrays.

A final aspect of the present invention relates to a method of calibrating an optical printer from an image printed by the printer, the method comprising: (i) assessing the contribution made to the image by each optical element of a printing head of the printer; (ii) adjusting the contributions for each element for a next print to be printed with the printer so that the contributions from each element are closer to being equal to one another; (iii) printing the next image; (iv) determining whether the image is acceptable, and (v) if the image is not acceptable, repeating steps (i) to (iv) until the printed image is determined to be acceptable.

Other features and advantages of the foregoing aspects of the invention are set out in the following detailed description of preferred embodiments, and elsewhere in the present application.

BRIEF DESCRIPTION OF THE DRAWINGS

Various preferred embodiments of the present invention will now be described by way of illustrative example and with reference to the accompanying drawings, in which:

FIG. 1 is a schematic representation of an illustrative optical printer;

FIG. 2a is a schematic representation of the optical illumination device disclosed in our prior European patent;

FIG. 2b is another view of the device shown in FIG. 2a;

DETAILED DESCRIPTION OF PREFERRED EMBODIMENTS

Various preferred embodiments of the present invention will now be described in detail. The following description is merely illustrative, and should not be construed as limiting—in any way—the scope of the present invention. It will be appreciated that many modifications and alterations may be made to the particular embodiments that are hereafter described, and notice is hereby given that all such modifications and alterations are within the scope of the present invention. For example, whilst the following description refers to the individual illuminating elements of the arrays as being light emitting diodes, it will be immediately apparent to someone of ordinary skill in the art that a variety of different types of illumination devices may instead be provided and as such a reference herein to LEDs should not be construed as a limitation of the scope of the present invention.

The term "photographic medium", as used herein, refers to any medium that may be optically exposed so that an image can then be generated by developing the medium. An illustrative example of such a medium is photographic paper. It should also be remembered that where the term "printing" or other related terms are used, we do not intend to refer to the deposition of inks and such like onto a medium. In general terms, "printing" in the context of the present application is the exposure of a photographic medium with light, and the developing of that medium to yield an image.

As mentioned above, one aspect of the present invention is concerned with improving the resolution achievable with an optical printer by reducing the physical size of the illumination device. However, we have found that our attempts to reduce the physical size of the illumination device have been hampered inter alia by the physical size of the LEDs of the red, green and blue arrays, and the spacing between the elements that must be provided to enable the elements to be connected to an electrical power source. One might think that the LEDs could be more closely mounted on the substrate if they were simply to be abutted one against the other. However, such an arrangement is not a practical possibility as there is then insufficient space for the electrical connections that must be provided to enable the individual LEDs to be energised.

Figure 3:
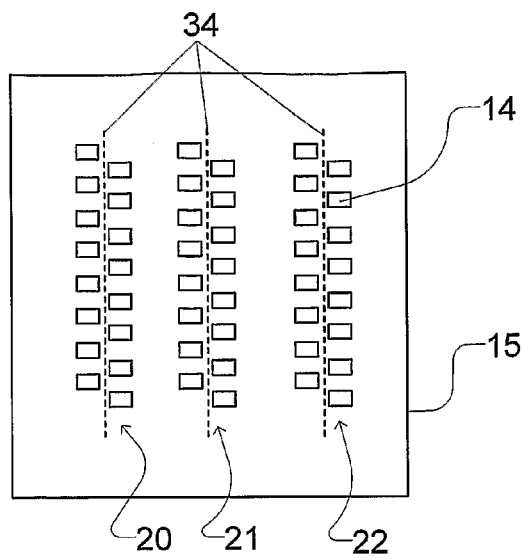
FIGS. 3 to 5 illustrate the configuration of optical elements on illumination devices according to three embodiments.

To address this problem, as shown in FIG. 3, we arrange arrays 20, 21 & 22 of LEDs 14 in columns along notional parallel lines 34 on a substrate 15, and in each column of LEDs we arrange the individual LEDs 14 so that they are offset from the associated notional line 34 (the dashed line in FIG. 3)—in effect to provide arrays of "castellated LEDs".

Figure 2B:
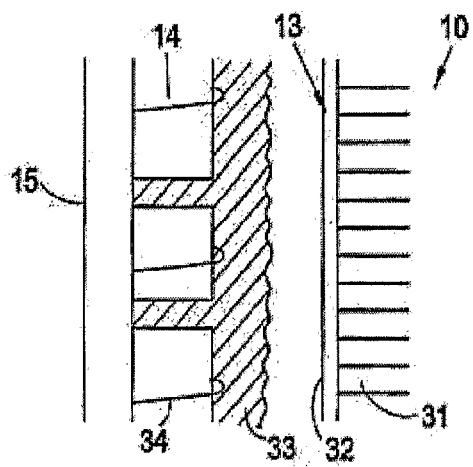
Figure 2C:
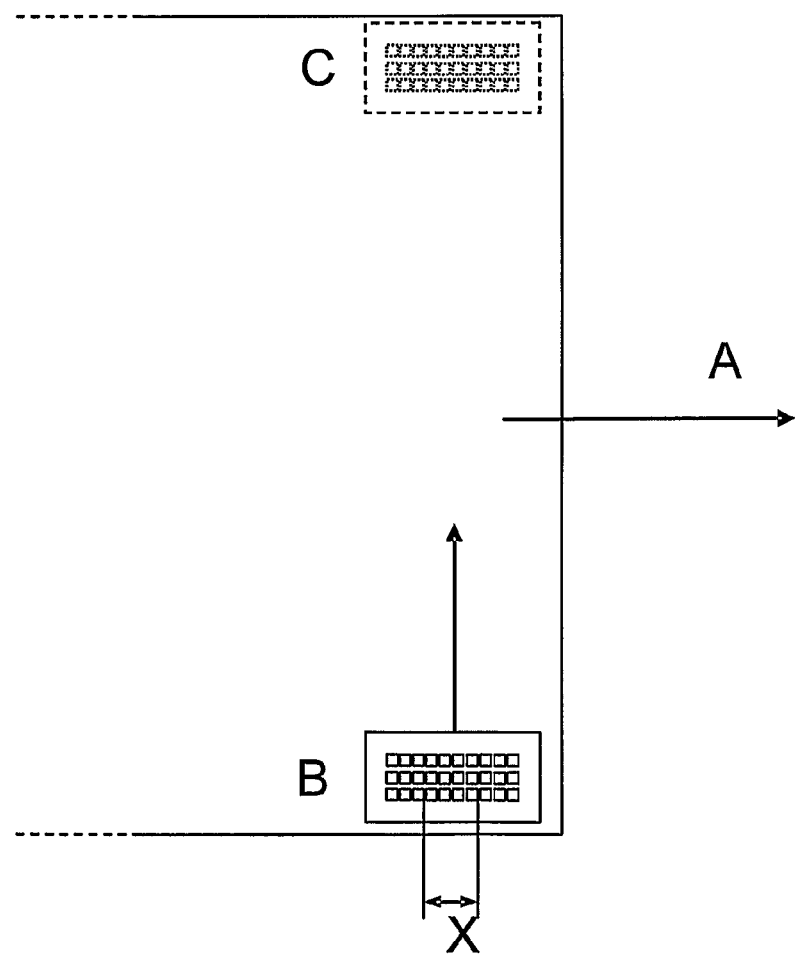
FIG. 2c illustrates how an illumination device moves over a photographic medium to expose successive swathes of an image.

As shown therein the LEDs 14 of each array (red 20, green 21 and blue 22) are more closely arranged in a vertical dimension (as orientated) than in the prior art arrangement depicted in FIG. 2(b). By more closely arranging the LEDs 14 in this way the spacing of individual components of the final image that are attributable to respective elements can be reduced, thereby improving the resolution of that image.

The offset of each LED 14 with respect to the associated notional line 34 on the substrate 15 is arranged such that the emission profiles of adjacent LEDs 14 in each array overlap to such a degree that components of an image printed by the optical printer on a photographic medium and attributable to adjacent LEDs are not readily resolvable. By this we mean that the image elements cannot be resolved when the image is viewed normally, only when the image is magnified several times. In a vertical dimension (as illustrated) the spacing between adjacent LEDs may be zero. In another arrangement the spacing between adjacent LEDs (in the vertical dimension) the spacing between adjacent LEDs may be less than zero so that the respective emission profiles of adjacent LEDs overlap to such a degree that components of an image printed by the optical printer on a photographic medium and attributable to those adjacent LEDs are not readily resolvable As aforementioned, another aspect of the present invention is concerned with addressing issues concerning the quality of the printed image, in particular the quality of the image as perceived by the human eye. With previously proposed devices, such as that disclosed in our prior abovementioned patent, we have noticed that the quality of the final image can sometimes be adversely affected by a so-called "banding" effect that can occur at the junction between successive printing swathes as the image is being exposed on the photographic medium. For example, we have noted that an overexposure of the photographic medium (visible as a noticeably darker band) can occur in the region where the swathes overlap.

Figure 4:
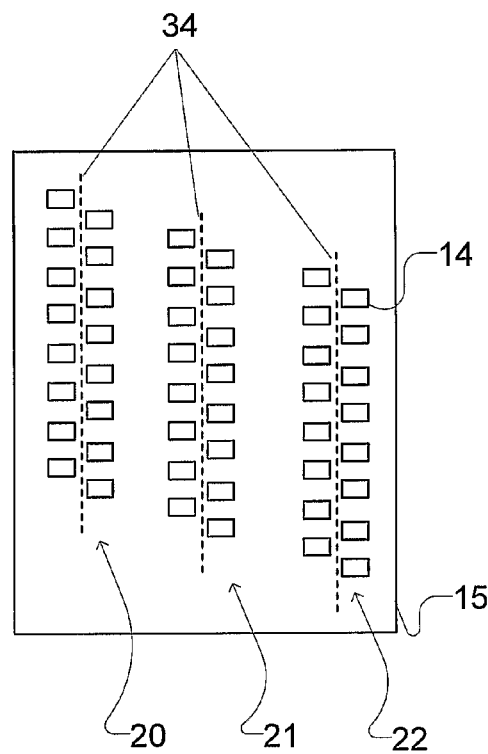
Figure 5:
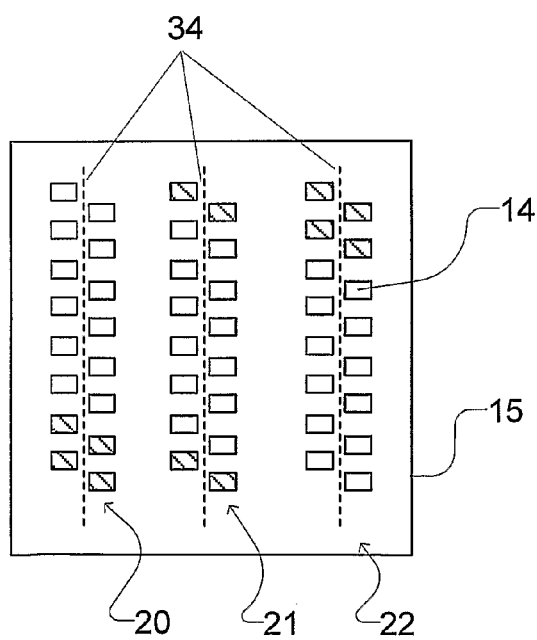

FIGS. 4 and 5 of the accompanying drawings show two arrangements that address such problems. In each of these arrangements the red 20, green 21 and blue 22 arrays are linearly offset (along the aforementioned notional lines 34) from one another. By adopting this arrangement, a join between adjacent swathes of the final image resulting from exposure of the photographic medium by the red array (say) occurs at a different location on the photographic medium to joins between adjacent swathes of that image which are attributable to the green and blue arrays. By virtue of this arrangement, junctions between swathes of the final image that are attributable to one of the three arrays, are unlikely to coincide with junctions between swathes attributable to the other two arrays.

In effect, by adopting such an arrangement errors at junctions between image swathes for the three arrays are not compounded (as they were in the device disclosed in the abovementioned patent), and as such for one of the arrays an error occurring at a junction between image components attributable to that array occurs at a point where it is unlikely that there will be errors in the components attributable to the other arrays and hence such errors are less perceptible to the human eye than they would be if all three arrays were aligned.

As aforementioned, these problems can be addressed in one embodiment (depicted in FIG. 4) by physically off-setting the three arrays 20, 21, 22 from one another. In another embodiment (depicted in FIG. 5), selected groups of LEDs 14 at one or both ends of the arrays 20, 21, 22 can be configured so that they are not illuminated (either by not connecting those LEDs to the power source, or alternatively by opting not to switch on those LEDs) to achieve the same off-setting effect. With reference to FIG. 5, those LEDs which are not illuminated are shown cross-hatched.

The offset between arrays is preferably chosen to correspond to a distance at the light receiving face of the fibre taper which provides an offset distance between arrays at the light emitting face of the fibre taper which is slightly greater than the largest likely positioning distance error that might occur when photographic medium is moved through the printer. In the specific example mentioned hereafter where the positioning error may be in the region of up to 4 microns, the offset distance between arrays at the light emitting face of the taper would preferably be slightly larger than this (say up to 6 microns), and the actual offset between arrays on the illumination device would be the offset distance at the light emitting face (in this instance up to six microns) multiplied by a factor corresponding to the magnification provided by the fibre taper (in a dimension parallel to the notional lines of the illumination device) from the emitting face to the receiving face.

As aforementioned, another aspect of the present invention is concerned with the structure of the illumination device, and the printing head incorporating that device. In particular, we have sought to address the problems associated with the fact that the quality of a given final image can sometimes be adversely affected by crosstalk between adjacent LEDs, and by variations in the relative intensities of the red, green and blue arrays. It is also the case that maintenance of the gap between the illumination device and fibre optic light pipe must be carefully controlled (to avoid aberrations in the final image) and such control can be difficult to achieve in practice.

Figure 6:
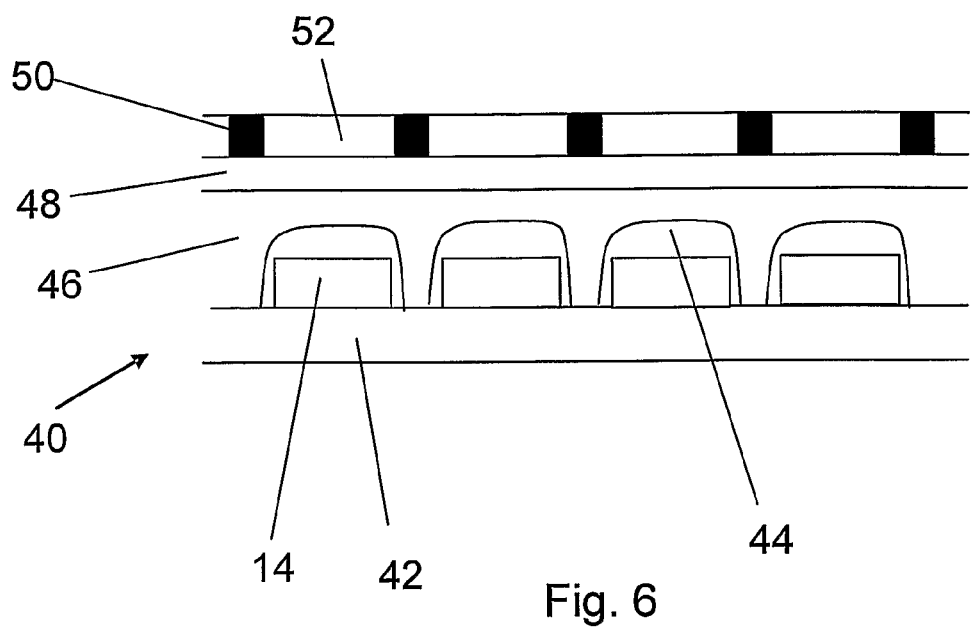
FIG. 6 is a schematic cross-sectional view of an illumination device.

To address such problems we have devised a novel illumination device structure that is illustrated in FIG. 6 (where FIG. 6 is a cross-sectional view of the device generally along one of the aforementioned notional lines on the substrate).

As shown, the illumination device 40 according to this aspect of the present invention comprises a substrate 42 on which the individual LEDs 14 are mounted. The substrate 42, at least on the side on which the LEDs 14 are mounted, is configured to reduce light reflection between adjacent arrays of LEDs and/or to reduce light reflection between adjacent LEDs in a said array.

Both of these features can be achieved by rendering selected parts or the whole of at least this side of the substrate 42 non-reflective—for example by covering it with a non-reflecting coating (e.g. black paint)—so as to reduce light reflection between LEDs or arrays (and hence cross-talk) via the substrate surface.

The LEDs are encapsulated within a light transmissive encapsulant 44, preferably a polymer encapsulant, so as to protect the elements and the electrical connections thereto (not shown). The encapsulated LEDs are then covered with a light transmissive medium 46, preferably a relatively viscous fluid medium, and a filter 48 is mounted on top of the medium. Baby oil has been found to be particularly suitable as a medium for covering the LEDs. By providing a fluid medium between the filter and encapsulated LEDs, it is possible to reduce reflections between LEDs by matching the refractive indices.

The filter 48 is, in the preferred implementation, different for one or more of the three arrays of light emitting elements. One function of the filter is to act as a band pass filter to reduce the exposure of the wrong colour (colour cross-talk) from each LED. A second function of the filter, if required for the particular array with which it is associated, is to absorb some of the emitted light so that the light intensities for all of the arrays are substantially equal, allowing easier electronic control of the LEDs. This is particularly the case for the blue LED array as blue LEDs tend to emit a greater intensity of useful light than similarly sized red or green LEDs, and because most photographic media tend to be more sensitive to blue wavelengths. To account for this, the filter associated with the blue LED array may absorb some of the emitted light as well as restricting that light to a predetermined range of wavelengths.

A mask layer 50 with apertures 52 is mounted on the filter layer so that the apertures (which are each slightly larger than the associated LEDs) are aligned with the LEDs. The provision of the mask again helps reduce cross-talk between neighbouring light emitting elements.

Figure 7:
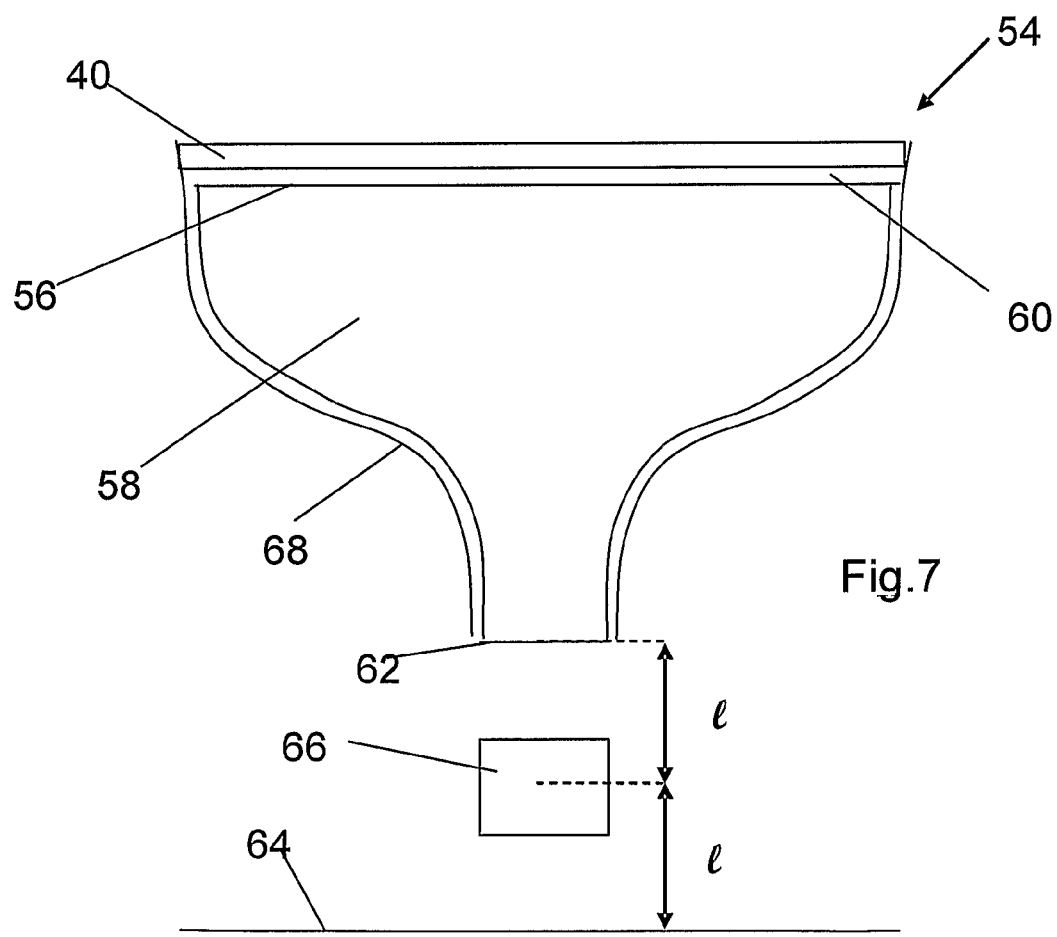
FIG. 7 is a schematic representation of a printing head assembly.

FIG. 7 is a schematic representation of a printing head 54 consisting of the illumination device 40 abutted against a light receiving face 56 of a tapered optic fibre light pipe 58 so that light emitted by the LED arrays falls on the light receiving face of the light pipe. A light transmissive fluid medium 60, for example a relatively viscous fluid with an appropriate refractive index, may be provided between the LED arrays and the light pipe 58.

Light is conveyed by the light pipe from the light receiving face 56 to a light emitting face 62, and from there to the photographic medium 64 via an optical lens relay 66. The relay is provided to avoid problems such as dust-pick up, and aberrations (e.g. spreading) that might otherwise be introduced were the light emitting face very close to the photographic medium, so as to illuminate it directly.

In the depicted arrangement the relay 66 is symmetrically arranged (i.e. the centre of the relay is a constant distance "I" from both the light emitting face and the photographic medium) to provide a 1:1 transference of light from the light emitting face 62 of the tapered light pipe 58 to the photographic medium 64. It may, however, be desirable to provide for an asymmetric transference of light to the photographic medium to reduce or expand the image produced on the photographic medium. The position of the lens relay with respect to the light emitting face and the photographic medium may be adjustable, and could be user-adjustable.

In one envisaged arrangement a plurality of different lens relays (each providing a different transference of light) may be arranged on a rotor so that different transferences of light may be achieved by rotating the appropriate lens relay into the light path between the light emitting face and the photographic medium.

In the preferred arrangement the tapered light pipe and the substrate are covered by a non-reflective cover 68 leaving only the light emitting face of the light pipe exposed.

In the context of the above and the present application as a whole, it will be appreciated that variations may be made. For example, it may not be necessary to provide band-pass filters. If filters are required or desirable, then high or low pass filters may be provided in addition to or instead of one or more band pass filters. It is also the case that the light source elements need not necessarily be LEDs. Other light sources, such as laser diodes or illuminated LCD arrays, may instead be employed. Lastly, it will of course be appreciated by those persons skilled in the art that the illumination devices shown in the drawings are purely illustrative. In practice it is likely that each array will comprise many more light emitting elements than are illustrated in the accompanying drawings.

As mentioned above, a persistent problem for optical printers, particularly those printers that use LEDs for light sources, is that the characteristics of the light sources vary dramatically from one to the other. For example, for any two LEDs of a particular colour both the intensity profile and wavelength profile of the light emitted by the LEDs, when driven by the same current, will vary considerably. These variations from one LED to another can show up as lines within swathes of a final printed image. It is also the case that light emitting diodes tend to vary non-linearly in both their output intensity and wavelength with input voltage variations, and a compounding problem is that the photographic medium (typically photographic paper) used for a particular print will directly affect the quality of that print and, furthermore, the characteristics of a given photographic paper will typically be quite different from those of another type of paper.

All of these different variations must be addressed if the quality of the final image is to be improved, and to this end it has previously been postulated that one could employ a series of photocells as an photographic medium, and feed back the output of those photocells to the light source elements to adjust the output of those elements and hence provide a uniform illumination of the paper. Although this would at first sight appear to be an attractive solution to the problem, it is unfortunately the case that photocells respond very differently to photographic paper, and as such adjusting the system to be best suited for a set of photocells will not necessarily provide an appropriate setting for printing on photographic paper.

To alleviate these problems, we have proposed to provide a calibration method and system whereby the printer is calibrated from one or more images printed with that printer. This approach is advantageous as the final image will of course incorporate all of the aforementioned non-linear variations, and as such by calibrating to the image one inevitably addresses all of the non-linear variations in the printer.

The process that we have developed is an iterative process whereby the printer is adjusted at each iteration by a predetermined factor less than the currently determined optimum adjustment factor. This arrangement has been deliberately employed as the calibration process could be unstable if the printer were adjusted to the currently determined optimum at each iteration.

Figure 8:
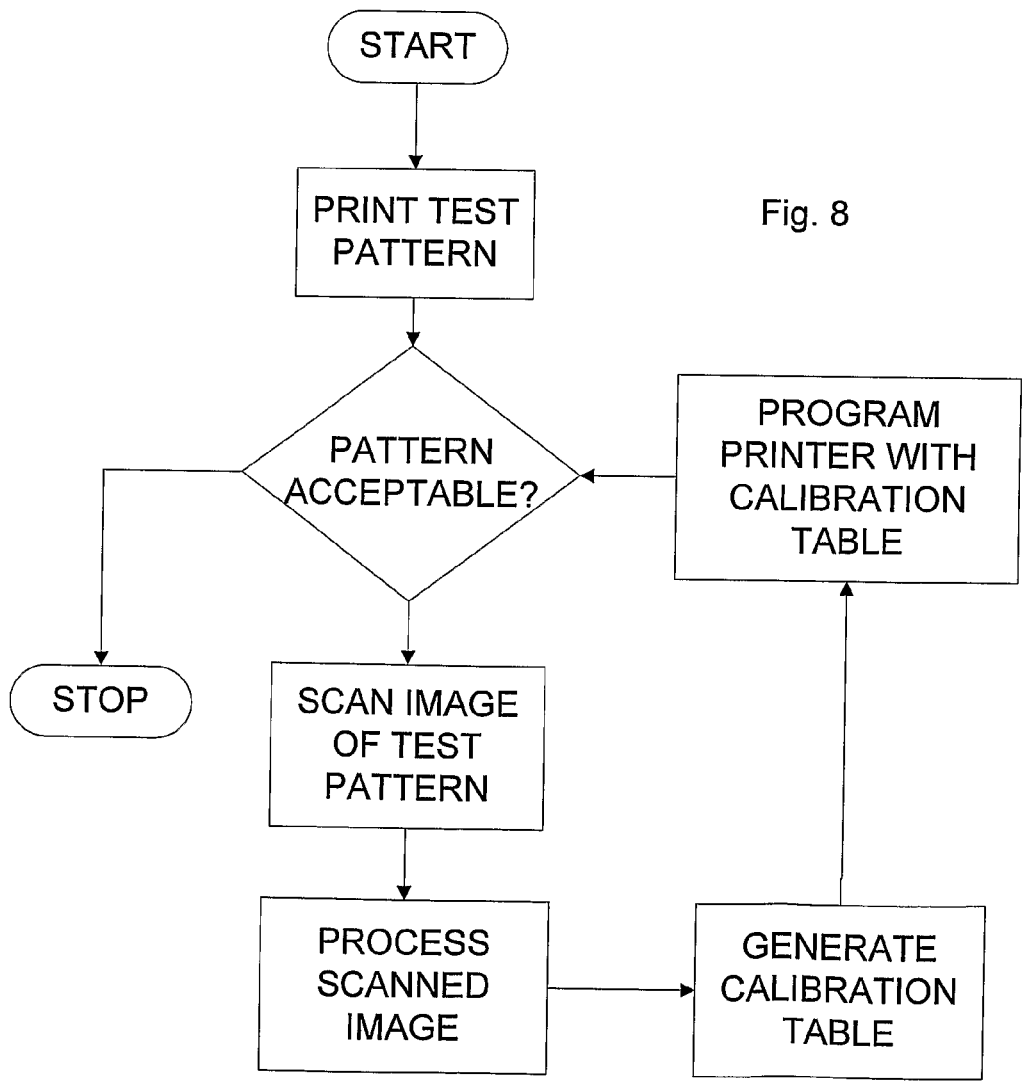
FIG. 8 is a flow diagram illustrating steps of an illustrative calibration method.

Referring now to FIG. 8 of the accompanying drawings, the first step in the process is to print a test pattern (of the type depicted in FIG. 9a) at the resolution of the printer—for example at approximately 400 DPI. It will be understood by persons skilled in the art, of course, that a resolution of 400 DPI for an optical printer is equivalent to a very much larger resolution provided by a typical inkjet printer, for example. Typically, the resolution achievable with an optical printer is about five times better than that achievable with an inkjet printer when printing at the same notional DPI resolution (in other words, a 400 DPI resolution for an optical printer is roughly equivalent to a 2000 DPI resolution for an inkjet printer).

Once the test pattern has been printed, the next step in the process is to ascertain whether or not the final printed image is acceptable. As is explained in greater detail below, this can be done manually by the operator or automatically.

If the printed test pattern image is not acceptable, the next step in the process is to scan the printed image with a colour scanner having a relatively high resolution, for example 1600 DPI. The test pattern is scanned directly to memory in a computer coupled to the scanner, and the next step in the process is to use the computer to process that scanned image to arrive a measure of its final quality.

Once the scanned image has been processed, or indeed as it is being processed, the computer generates a calibration table which defines a series of adjustments for each of the light emitting elements in the illumination device of the optical printer.

Once the calibration table has been completed, the next step in the process is to program the printer with the calibration table (to adjust the output of each of the light emitting elements) and once this has been completed the next step in the process is to print another test pattern.

Once this second test pattern has been printed it is, in one embodiment, visually assessed by the operator of the printer to determine whether or not the image is acceptable. If the image is acceptable, then the calibration process is halted and the printer is ready for use. On the other hand, if the image is not acceptable, the process continues (in the manner described above) until a final image is printed that is visually acceptable to the operator.

In a second embodiment of this process not depicted in the drawings, the printed final test pattern may be output to a scanner that is under the control of the computer and is configured to scan the image, following which the computer may automatically assess the quality of the scanned image (in accordance with predetermined criteria the like of which are well known to persons skilled in the art) before processing the image to generate a calibration table, and continuing with the calibration process as previously described until an acceptable image is printed.

Figure 10:
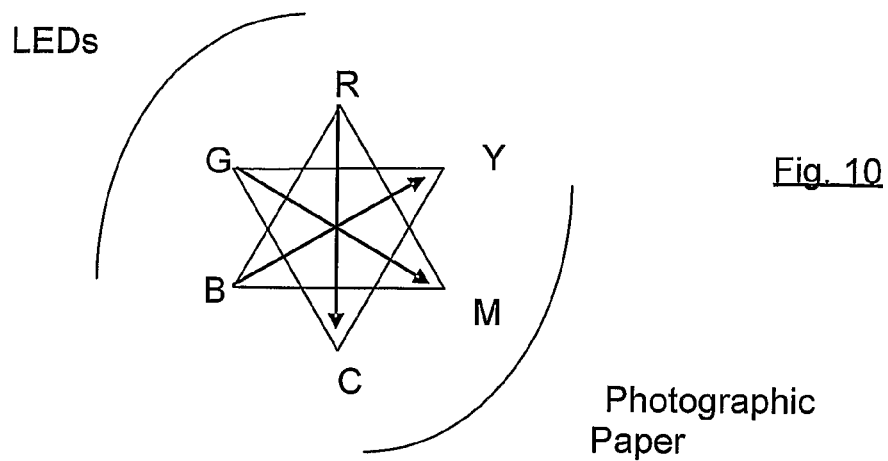
FIG. 10 is a chart depicting the relationship between LED colour and the colour of a corresponding image on photographic paper.
Figure 9A:
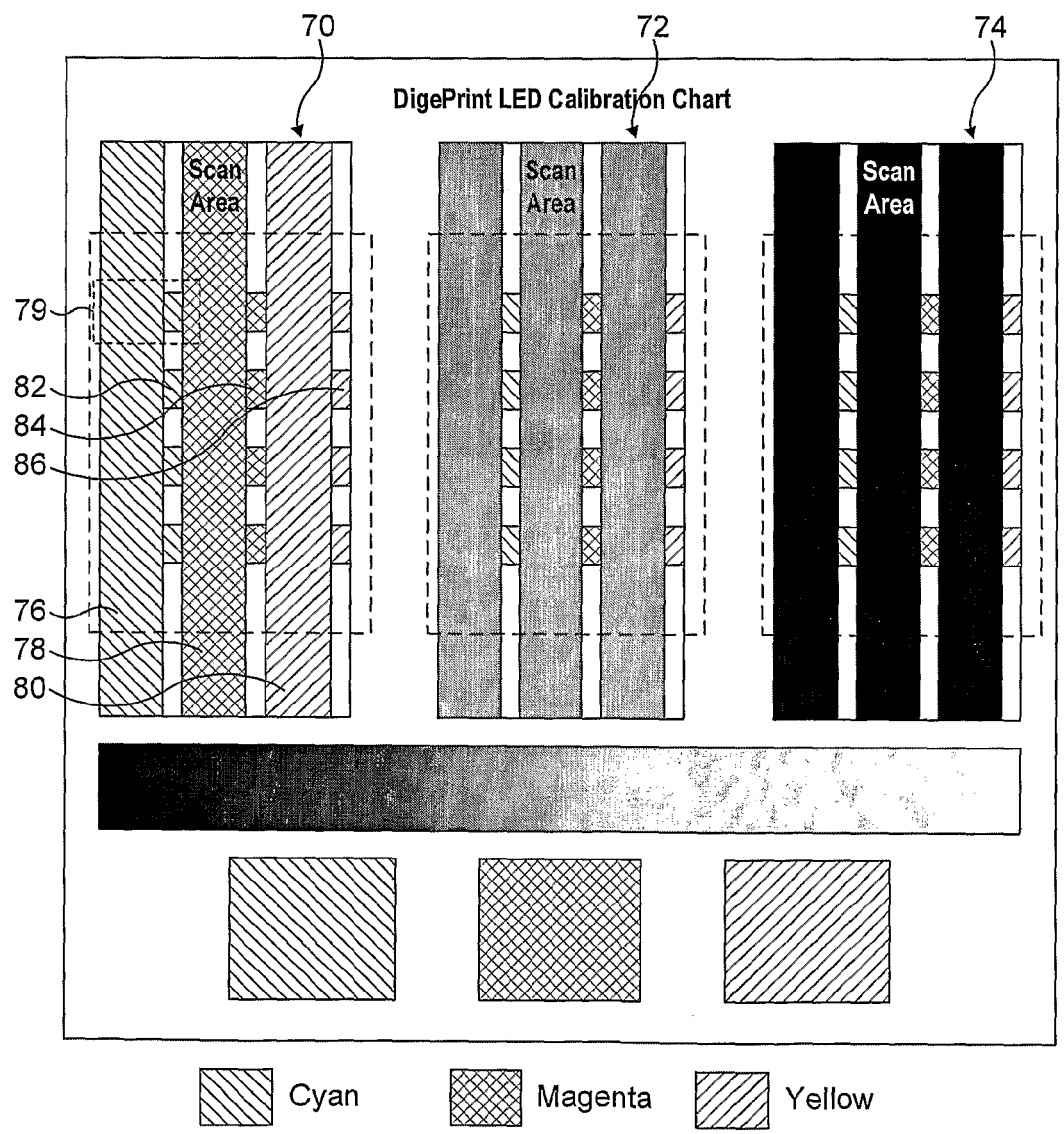
FIG. 9a is an enlargement of part of FIG. 9.

FIG. 9a, as aforementioned, is a schematic representation of a test pattern that we have developed for use with our calibration process. However, before explaining the detail of this pattern it is useful first to explain that when a photographic medium, such as photographic paper for example, is illuminated with a green LED a magenta image is produced on the paper. Similarly, when the paper is illuminated with a blue LED a yellow image is produced on the paper, and when the paper is illuminated with a red LED a cyan image is produced on the paper. This relationship between LED colour and the colour of the corresponding image on the paper is depicted schematically in FIG. 10.

Referring now to FIG. 9a, the test pattern proposed for use with our calibration process consists of a number of discrete test areas—each of which has a specified function. The first of these consists of three scan areas 70, 72 and 74 printed at a low intensity, a medium intensity and a high intensity respectively. Whilst it would be possible to calibrate the printer using only one such scan area, three areas at different intensities is preferred as the output of a given LED varies non-linearly with input voltage. More or less test areas may be employed depending on the exact specification of the printer resolution.

Each scan area consists of a colour block 76, 78 and 80 for each array (red, green, blue), and an LED identification print area 82, 84 and 86 for each array (red, green, blue). As shown in FIG. 9a (and in greater detail in FIG. 9b), the LED identification print areas are printed immediately adjacent their associated colour block. Thus, in the particular example depicted the printer has energised all of the red LEDs to print colour block 76, following which a subset of those red LEDs has been energised to print LED identification print area 82. Then the red LEDs have been switched off and the green LEDS have been switched on to print colour block 78, following which a subset of those green LEDs has been energised to print identification print area 84. Finally, the green LEDs have been switched off and all of the blue LEDs have been energised to print colour block 78, following which a subset of those blue LEDs has been energised to print identification area 86.

Figure 9B:
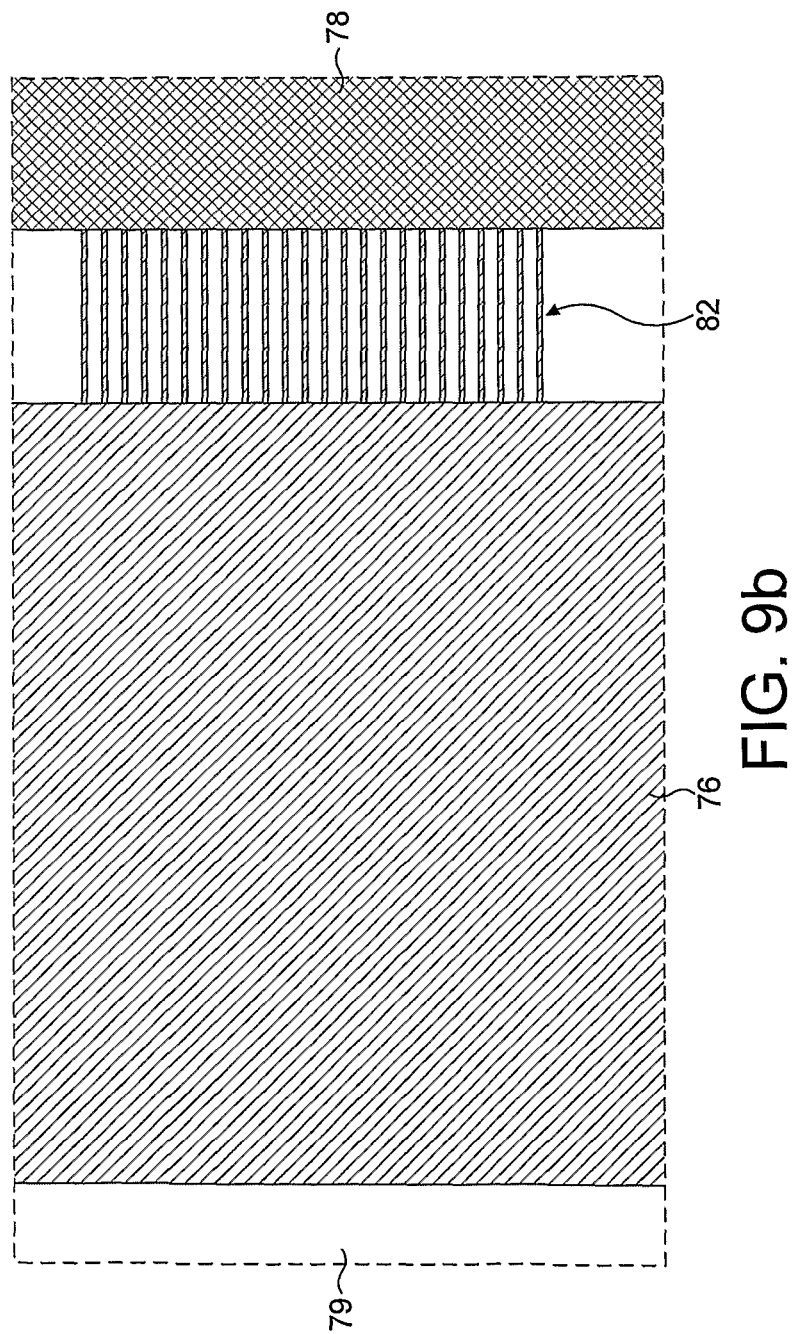
FIG. 9 is a schematic representation of an illustrative test pattern.

FIG. 9b is a magnified view of a region 79 of the test pattern depicted in FIG. 9a showing a cyan colour block and associated identification area as generated by illumination of a photographic medium with a Red LED array. As is clearly visible the identification area consists of a plurality of parallel lines, and each line is attributable to a specified LED. In the particular example shown, the subset energised to print the identification area consists of every fourth LED of the associated array (i.e. the first line results from the first LED in the array, the second line results from the fourth LED, the third from the eighth LED and so on). The parallel lines allow the computer to identify a particular row of the associated colour block that results from the particular LED that printed the line, and by interpolating between adjacent printed parallel lines the computer can attribute a row of the accompanying colour block to each LED of each array.

Each scan area of the test print is bounded by a dashed line which enables the computer to identify each scan area in the printed test image for further processing, and the first LED identification area of each scan area includes a pair of crosses "+" that provide an indication of the orientation of the array, and hence enable the computer to autorotate the scan area in the event that the test image was slightly askew when scanned.

To generate the scanned image for processing by the computer, a printed test pattern (of the type depicted in FIG. 9) is scanned with a colour scanner, preferably a flatbed scanner. For an optical printer printing at 400 DPI, the scanner should have a resolution of at least 1,600 DPI and a colour density range of at least 2½D. The image is scanned directly to memory of the computer, for processing.

Processing of the scanned test pattern consists of the following steps. First, the computer identifies a desired scan area (using the aforementioned dashed lines as boundary markers) of the scanned image. Next the computer interrogates the scan area to find the aforementioned orientation markers (the crosses—"+"), and if necessary rotates the scan image to correct any skew that has arisen in the scanning process.

The computer then looks for the first parallel line in the first LED identification print area to establish a Y position for the first LED of that array (in this instance the red array). The computer then interpolates between adjacent parallel lines to establish the exact Y position of each LED in the array.

Next the computer scans the colour block to the left (as depicted) of the LED identification area for each LED of this first array and measures, in an X direction, the intensity of the printed image. The computer then averages the measured intensity to establish, for each LED of the array, an average intensity profile.

The computer then normalises the calculated average intensity profiles for each of the LEDs to the dimmest of those LEDs, and generates a calibration table consisting of (for each LED) a factor by which the exposure time must be reduced (from a maximum) so that the output of all the LEDs in the array are substantially constant. Of note at this point is the fact that variation of the exposure is effected by varying the time for which each of the LED elements illuminates the photographic medium, rather than by varying the current driving the LEDs as LED output tends to vary non-linearly with current. It is also of note, as mentioned above, in our process we reduce the exposure time by a predetermined factor less than the optimum determined for that iteration. For example, the computer may be configured to calculate an exposure time reduction that is only 90% of the value that the optimum reduction has been determined to be for that iteration. Effectively, the calibration table consists of a plurality of multipliers (one for each LED) specifying the extent to which the switch-on time for each of the LEDs should be reduced.

In another embodiment of this invention, the exposed "blocks" of colour are superimposed to give "grey" blocks. The exposure of individual LEDs can be measured in these blocks simply by selecting a single colour channel in the software analysis of the scanned image. The advantage of this embodiment is that it enables correction to be made for "colour cross-talk", i.e. the exposure of a colour by the wrong colour of LED.

Another aspect of the present invention, as mentioned above, is concerned with improving the transport mechanism for the photographic medium.

A particular requirement of that transport mechanism is that to enable the printer to achieve resolutions of the scale aforementioned and provide a high quality output, the components of the transport mechanism must be carefully designed and controlled to enable photographic medium movement with a tolerance of in the region of a few microns, typically roughly four microns. By this we mean that when it is desired to move the photographic medium a given distance through the printer, then the mechatronics of the transport mechanism must typically be such that the actual transport distance is within plus or minus four microns of the desired distance.

As will no doubt be appreciated by persons skilled in the art, if the actual transport distance should be greater than the desired typical distance by more than four microns then visible white bands may be produced in the final image. Similarly, if the transport distance should be less than the desired distance by more than four microns, then adjacent swathes of the image may overlap to a noticeable degree and the final image will be spoiled. It is critical, therefore, that the transport mechanism design is such that highly accurate photographic medium transport is enabled.

Figure 11:
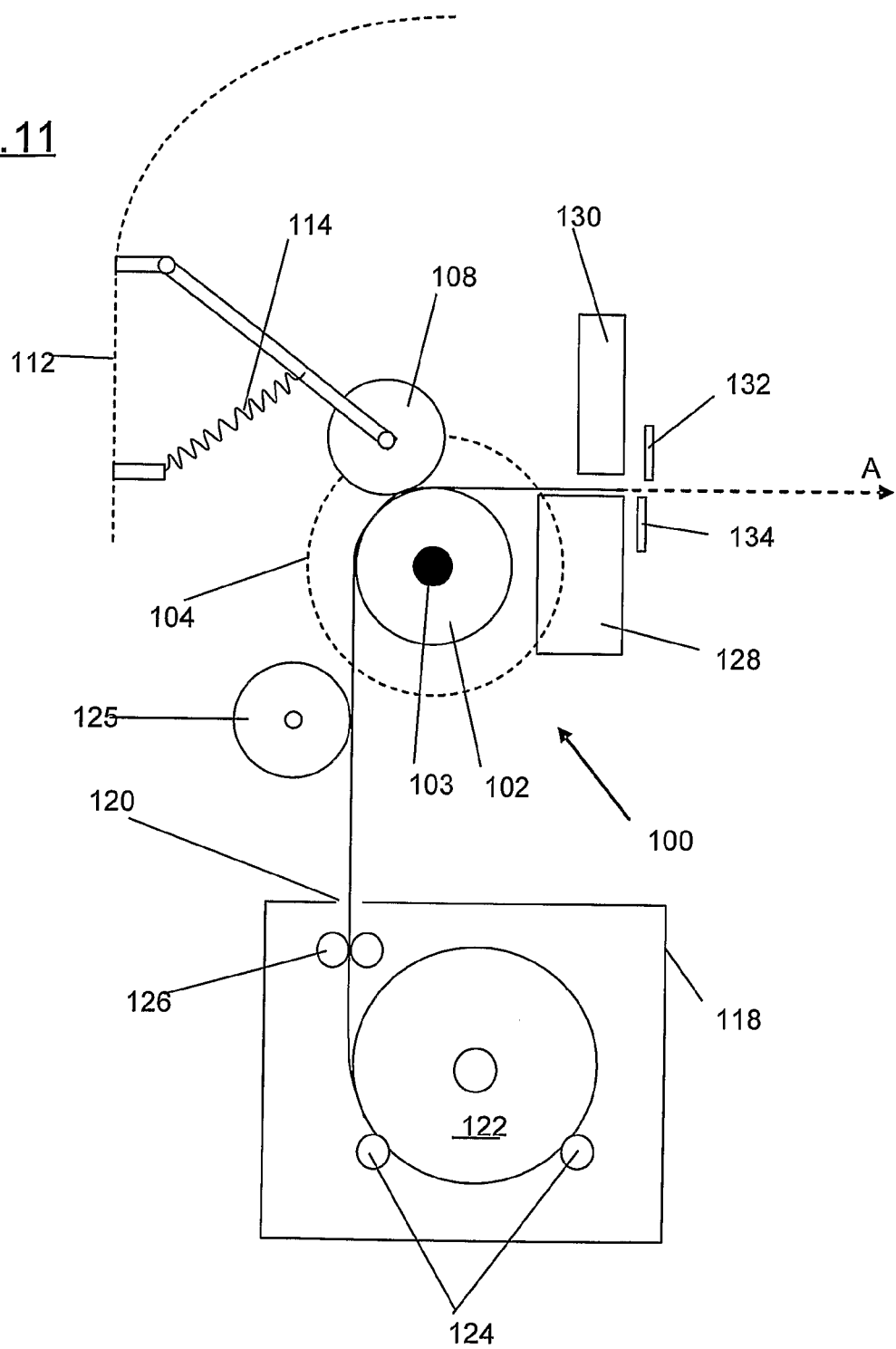
FIG. 11 is an illustrative representation of a transport mechanism for an optical printer.

Referring now to FIG. 11 of the accompanying drawings, the transport mechanism 100 of this preferred embodiment comprises a photographic medium transport roller 102 that is driven by a motor (not shown) and includes an outer surface that is configured to provide a relatively high level of grip. For example, in the preferred arrangement the roller 102 is electroplated with graded diamond chips that are extremely durable and provide the outer surface of the roller with the required high level of grip.

The transport roller 102 is of metal, and in this instance comprises a steel roller that is accurately ground so as to have, within acceptable tolerances, a circular cross-section. Steel is particularly preferred as a material for the roller due to its strength, durable nature and ease of electroplating.

The transport roller includes a central axle 103 that is driven by the aforementioned motor, and it is preferred for that motor to comprise an accurate stepper motor. Mechanical damping (for example to counteract inertia effects that might otherwise cause a degree of continued transport roller rotation after the stepper motor has stopped) of a known friction brake type is provided on the axle to ensure, again within acceptable tolerances, that the roller stops at a desired position when the motor stops.

An optical encoder is mounted concentrically with the axle and includes a slotted disk 104 and an optical emitter/detector pair (not shown) provided on respective sides of the disk. As the slotted disk rotates, light from the optical emitter passes through the slots of the disk and is detected by the detector to generate a pulsed signal that is interpreted to derive a measure of the distance that the disk has rotated (and optionally also the speed of rotation). This signal is passed to a controller (not shown), such as a computer or ASIC (application specific integrated circuit), which operates in a feedback loop (preferably a closed feedback loop) with the stepper motor to control the stepper motor to drive the transport roller axle and hence the transport roller.

Advantageously, by providing a slotted disk which is substantially larger in diameter than the diameter of the roller it is possible to detect a smaller angular rotation of the roller than would otherwise be possible were the disk to be of the same or similar diameter to that of the roller.

In addition to the transport roller, the printer also includes a pressure roller 108 that is mounted to the printer, for example to the chassis 112 thereof, by means of one or more moveable arms that are biased by a spring 114 or other resilient biasing means to bear upon the transport roller 102.

In the preferred arrangement the pressure roller 108 comprises a plurality of free running rollers mounted on a common axis and separated from one another and from the one or more arms by appropriate resilient biases (such as springs). The pressure roller functions to press photographic medium against the transport roller to thereby reduce the possibility of the photographic medium slipping as it is advanced by the transport roller.

Photographic medium is supplied from a canister 118 that includes an exit slot 120 which is shielded so as to prevent inadvertent exposure of the photographic medium before the canister is inserted in a printer for use. Photographic medium is provided as a roll 122 and the roll 122 is mounted on a plurality of rollers 124 which are driven by a motor (not shown). The rollers 124 are configured to provide sufficient gription to wind photographic medium from the roll out of the slot 120 via a set of pinch rollers 126 in a photographic medium transport direction generally indicated by the arrow "A", and to wind photographic medium back into the canister to take up any slack that might occur. The amount of gription provided by the rollers is carefully chosen so that once any slack has been taken up the roll slips on the rollers and winding of photographic medium back into the canister halts. The motor is controlled by a controller (potentially the same controller that controls the transport roller) to control the rollers 124 to wind photographic medium into or out of the canister.

One or more supply rollers (indicated generally by reference numeral 125) are provided between the canister 118 and the transport roller 102. The supply rollers 125 and the pressure roller 108 are arranged, with respect to the transport roller 102, so that the photographic medium makes a 90 degree contact with the transport roller 102. This arrangement is preferred as it avoids the possibility of point contact between the photographic medium and one or more of the rollers, which contact could cause a jam.

Immediately after the transport roller 102, in the direction A of photographic medium transport, there is provided a vacuum bed 128 which is operable to apply a downwards force (as depicted) to the photographic medium to ensure that the photographic medium is flat when passing under the printer's optical printing head 130. Without such a vacuum bed the photographic medium may not be absolutely flat, and any curvature would cause problems with focusing of the optical image on the photographic medium and the size of the printed swathe.

Immediately after the head 130 and vacuum bed 128, in the direction A of photographic medium transport, there is provided a cutter blade 132 that is operable to bear against a suitable anvil 134 to cut photographic medium passing therebetween. For reasons that will now be explained, the distance from the trailing edge of the printing head in the direction of photographic medium transport (i.e. the edge nearest to the cutter blade 132) is known, as is the length of the transport path from the canister to the cutter blade 132.

When a new canister is inserted in the printer (typically with a standard length of photographic medium projecting out of the slot 120), the control system of the printer detects the presence of the canister and controls the canister motor to drive the rollers 124 to wind photographic medium from the roll 122 out of the canister and to the transport roller by way of the supply rollers 125. The transport roller is rotated and the photographic medium is pressed against the high grip surface of the roller by the pressure roller 118. The photographic medium is fed by the transport roller via the vacuum bed between the cutter blade 132 and the anvil 134 until a known length of photographic medium (greater than the standard length of photographic medium that was originally projecting from the canister) has passed therethrough. At this point the canister motor and the transport roller motor are stopped, the cutter is moved against the anvil to cut off the length of photographic medium that has passed therethrough (which length is then treated as waste and passed from the printer in the normal way).

The motor for the transport roller is then energised to rotate the roller in the opposite direction by a known distance corresponding to the distance between the aforementioned trailing edge of the optical printing head 130 and the cutter blade 132. The transport roller motor is then stopped and the canister motor is energised to drive the rollers 124 in the opposite direction to take up any slack in the photographic medium that has been fed from the canister.

With the photographic medium properly located the head can be moved over the surface of the photographic medium to expose a swathe of the photographic medium so that an image can be generated. Once the swathe is completed the transport roller motor is energised to rotate the transport roller to advance the photographic medium so that next image swathe can be exposed.

This process continues, with the canister motor being intermittently energised as required to drive the canister rollers in reverse take up any slack, until the image to be printed is completed. The transport roller is then rotated to transport the photographic medium by a known distance corresponding to the distance between the leading edge of the optical head (i.e. the edge closest to the transport roller) and the cutter, following which the cutter is operated to separate the portion of photographic medium that has been exposed from the remainder (which portion is carried from the cutter by a further transport mechanism (not shown) for further processing (e.g. developing within the printer).

The transport roller motor is then energised to drive the transport roller in reverse to draw the photographic medium back from the cutter by a known distance corresponding to the distance between the trailing edge of the optical head and the cutter blade, and the canister motor is energised to drive the canister rollers to take up any slack in the photographic medium supplied from the canister. Once the slack has been taken up the printer can then be operated to print another image.

A final aspect of the present invention relates to the fact that it would be advantageous if a printer could be devised that provided a greater throughput of photographic medium. It would also be advantageous if such a printer could readily accommodate photographic medium of different sizes.

As mentioned above, one relatively simple way to increase photographic medium throughput would be to increase the speed at which the optical head assembly travels over the photographic medium, however such an approach would not provide that great an increase in speed as the head must be over a given point on the photographic medium for a fixed minimum amount of time (for a given photographic medium) to expose that point to the requisite amount of optical energy required to generate the image, and hence it is impossible—without adversely affecting the quality of the final image—to increase the speed of the head to a point where it is over a given point of the photographic medium for less than this fixed minimum period of time.

To address this problem this embodiment provides for processing of multiple media simultaneously by arranging discrete media in a side-by-side fashion and exposing respective swathes of the so-arranged media with one pass of the optical head assembly. By virtue of this arrangement it is possible to greatly increase (for example to almost double) the rate of media transport through the printer.

Another advantage of this arrangement is that as the printer is configured to enable simultaneously processing of two side-by-side media, the length of head travel has been increased to a point where processing of much larger (wider) media is possible. In the particular arrangement hereafter described a novel transport mechanism is provided that enables printing on side-by-side media of a given size as well as on media of approximately double the size of either of the individual side-by-side photographic mediums.

Figure 12:
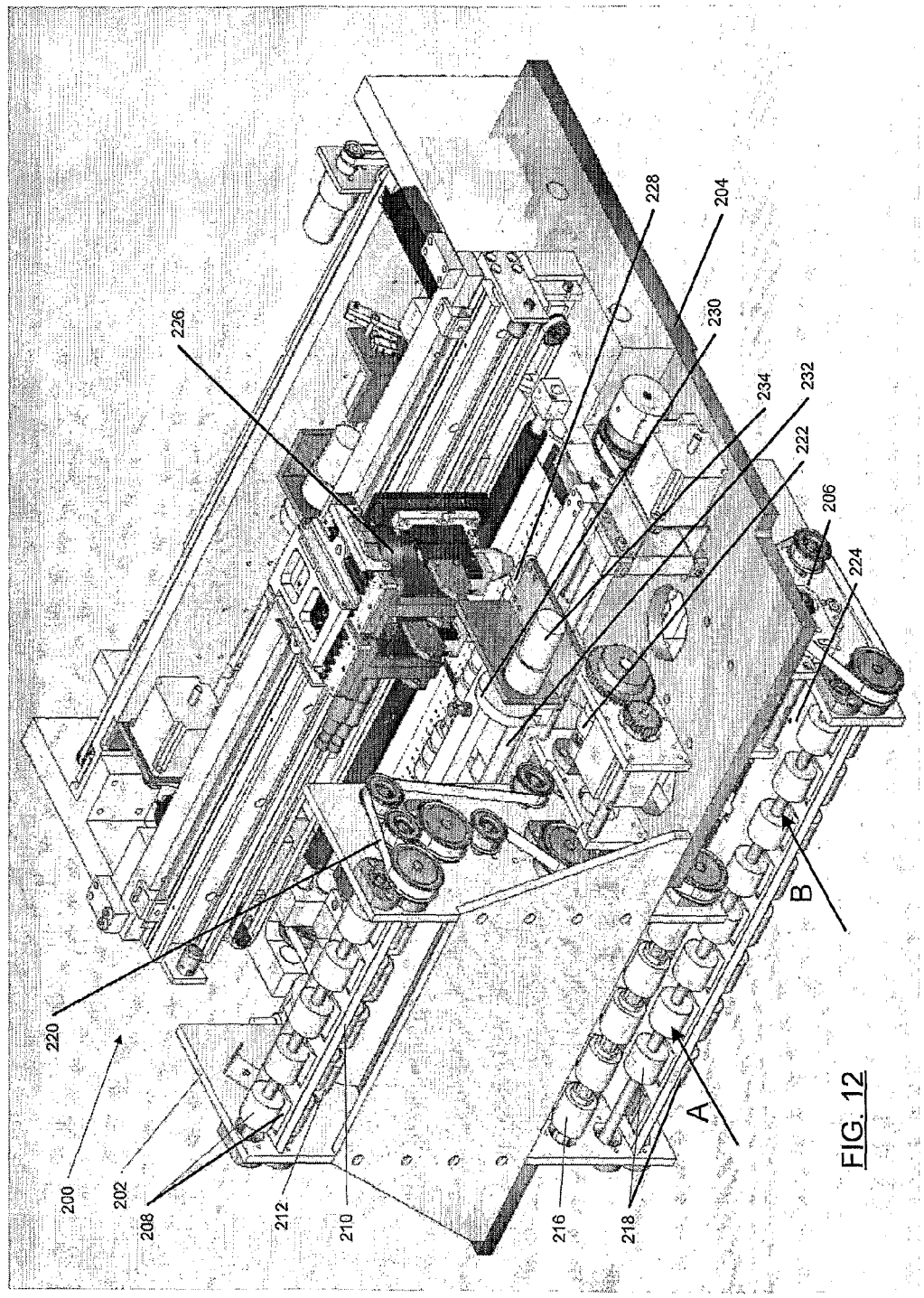
FIG. 12 is a schematic perspective view (from a photographic medium entry end) of a photographic medium transport, processing and cutting component of an optical printer.

Referring now to FIG. 12, the photographic medium transport, processing and cutting component 200 (hereafter referred to as the TPC component) comprises a first photographic medium transport assembly 202 mounted on top of a base plate 204, and a second photographic medium transport assembly 206 mounted below the base plate 204. As shown, the second photographic medium transport assembly 206 is significantly wider than the first transport assembly 202, and as will later be described this transport assembly provides a means whereby media larger than the width of the first transport assembly can be processed by the printer.

Media is fed to the component depicted from one or more media cassettes (not shown), and fed out of the component depicted into a developing component (also not shown) where the exposed photographic image is developed.

The first photographic medium transport assembly (shown upstanding from the base plate) comprises a first pair of rollers 208 that abut through slots formed in a curved media guide 210 (best viewed in FIG. 13), a second pair of rollers 212 (one of which is visible in FIG. 12, and the other of which is visible in FIG. 13) disposed below the first pair, a third pair of rollers 214 (one of which is visible in FIG. 13) disposed below the second pair, and a fourth pair of rollers 216 provided slightly below the base plate 204 and the third pair of rollers 214.

The first to fourth pairs of rollers each comprise a driven roller (driven by belt drive assembly 220 and associated motor 222) and a free-running roller, the driven and free running rollers being mounted in a chassis component upstanding from the base plate 204. The second photographic medium transport assembly comprises a fifth pair of rollers 218 that abut through slots provided in a second media guide 224, and which are provided below the aforementioned fourth pair of rollers 216.

The fifth pair of rollers are significantly longer (typically more than twice as long as the first to fourth pairs of rollers and provide, in a first configuration, an entry to the TPC component 200 for media wider than the length of the first to fourth pairs of rollers. Furthermore, that portion of the fifth pair of rollers which is longer than the fourth pair provides, in a second configuration, an entry to the TPC component 200 for a second length of media to thereby enable simultaneous processing of both a first and the second lengths of media.

Figure 14:
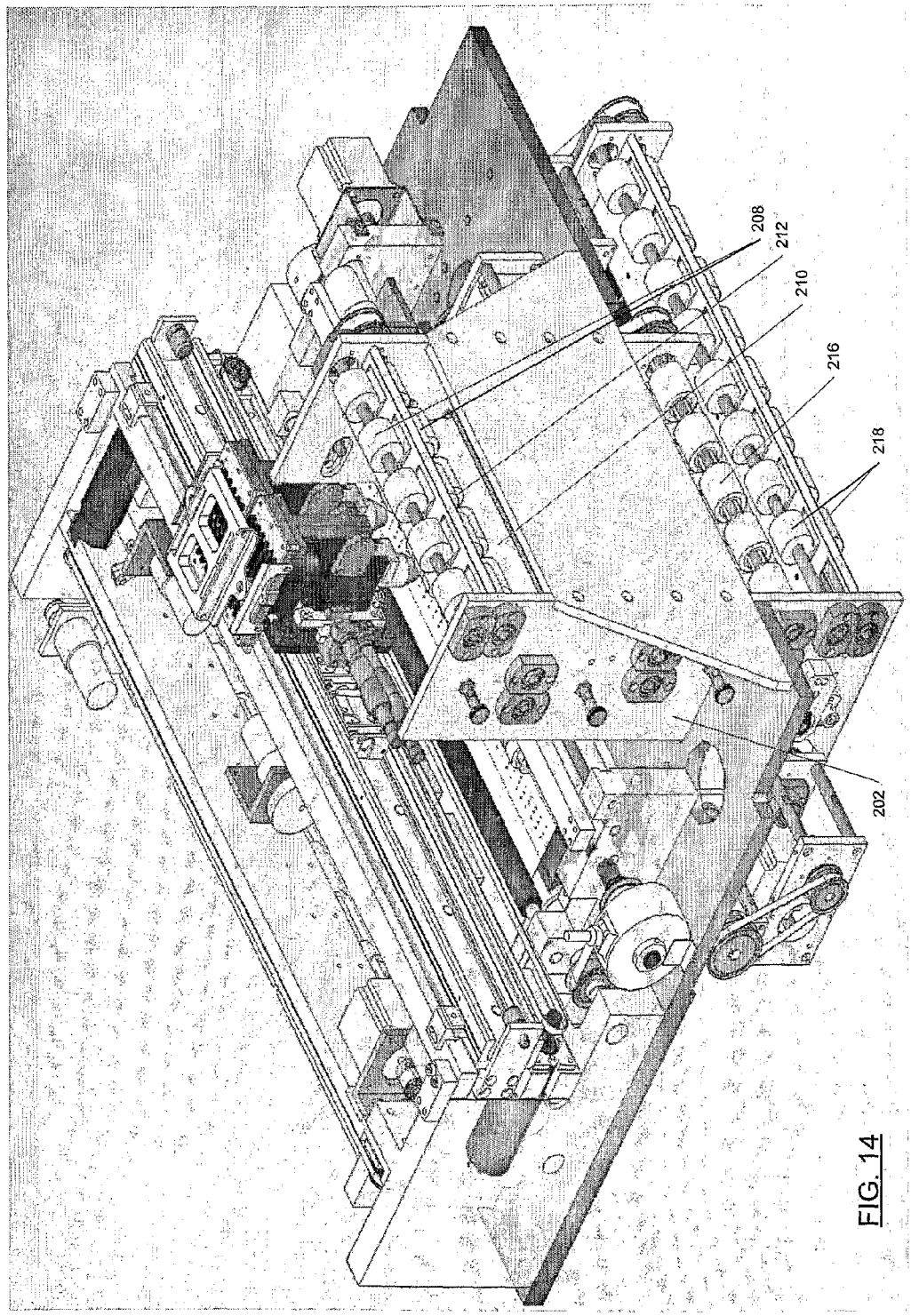
FIG. 14 is a schematic perspective view of the component shown in FIG. 12 from another direction.

Considering this first configuration, media having a width larger than that of the first to fourth roller pairs enters the TPC component 200 between the fifth pair of rollers 218 and passes along and above the media guide 224 to a set of rollers (the drive mechanism for which is visible in FIG. 14 under the base plate 204) provided beneath the base plate 204, which rollers turn the media towards the base plate 204 and upwards through a slot in the base plate 204 into contact with a diamond coated transport roller (not visible) of the type shown in FIG. 11.

In the second configuration, a first length of media passes between the first roller pair 208 to the underside of the media guide 210 and from thence between the second, third and fourth pairs of rollers. The first length of media exits from the fourth pair of rollers and passes over the topmost roller of the fifth roller pair before passing between the rollers of the fifth roller pair 218 (in direction A) and above and along the media guide 224 to the aforementioned rollers mounted beneath the base plate 204, which rollers turn the first length of media towards the base plate 204 and upwards through a slot in the base plate 204 into contact with the diamond coated transport roller.

A second length of media (typically (but not necessarily) of equal width to the first length of media) passes in direction B between the fifth roller pair and along and above the media guide 224 to a set of rollers (not visible) provided beneath the base plate 204, which rollers turn the media towards the base plate 204 and upwards through a slot in the base plate 204 into contact with the diamond coated transport roller. The first and second lengths of media are, in this arrangement, disposed substantially parallel to one another with a small gap therebetween. The two lengths of media, as will later be described, pass under the optical head assembly 226 (which comprises in this arrangement two offset illumination devices), and the head moves across both of the lengths of media to print (i.e. optically expose) successive swathes of an image (in a preferred arrangement the same image) on each of the two media lengths. In an alternative arrangement, two printing heads could be provided, each being arranged to expose a respective one of the two lengths of media.

As with the arrangement depicted in FIG. 11, media is urged into abutment with the diamond coated roller by a pressure roller 228 that is mounted on a pair of moveable arms that extend in the direction of media transport. To facilitate adjustment of media alignment within the TPC component 200 there is provided a cam 230 to which a laterally extending bar 232 is fastened. The cam is drivable by a motor 234 to bring the bar 232 down towards the base plate 204 and against free ends of the arms (not visible) on which the pressure roller 228 is mounted to pivot the arms and thereby lift the pressure roller 228 away from the diamond coated transport roller so that media alignment within the TPC component can be adjusted.

In the arrangement shown in FIG. 11, a cutter is provided immediately behind the optical head assembly in the direction of media transport through the printer.

Figure 13:
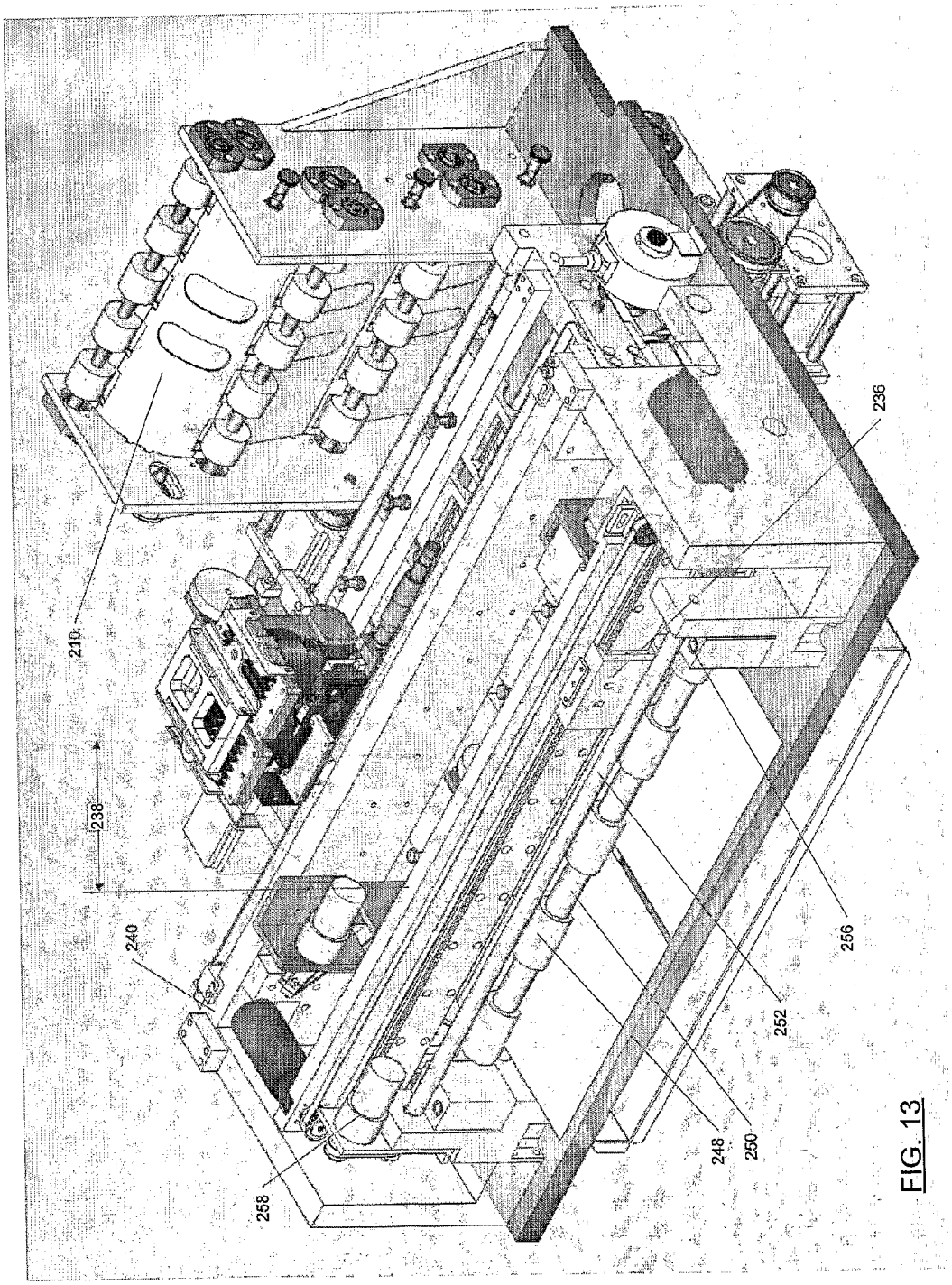
FIG. 13 is a schematic perspective view from a photographic medium exit end of the component depicted in FIG. 12.

In this arrangement (as shown in FIG. 13), however, the cutter 236 has been moved forwards (relative to the optical head assembly) in the direction of media transport so that there is a gap 238 between a first beam 240 on which the optical head assembly is mounted and a second beam 242 on which the cutter 236 is mounted.

In this gap 238 there is provided a flap (not visible in the drawings) which is moveable to open a slot in the base plate 204 and provide access to a dead loop (also not shown) under the base plate 204 through which media travels before returning above the base plate and moving forwards through the cutter 236. This dead loop is provided so that the path length for media traveling though the TPC component 200 can be varied as the media processing speed and media transport speed vary with different media sizes, and ultimately so that operation of the cutter can be properly synchronised with media transport so that each section of media is cut at the correct point.

To the front (in the direction of media transport) of the cutter assembly there is provided a pair of rollers consisting of a free-running roller 244 and a clamp roller 246 mounted thereabove. The clamp roller comprises larger deformable sections 248 (for example of foam material) that can rotate about the axis of the clamp roller, and smaller non-deformable sections 250. Immediately above the clamp roller there is provided a lateral bar 252 that is supported at either end on blocks 254 that are each movable against a spring bias on respective locating pins 256. The bar is configured to be driven by a motor 258 to depress the blocks and press the non-deformable sections of the clamp roller 246 against the free-running roller to clamp media therebetween. Once the media has been clamped in place, the cutter 236 can be operated to separate the exposed sections of media for subsequent developing in the adjacent developing section (not shown) of the optical printer.

Once the cutter has been operated, the blocks (and bar) move away from the free-running roller 244 and the cut sections of media that were previously clamped between the free-running roller and the clamp roller are released to be carried into the developing section by driven belts. In a particularly preferred arrangement, the driven belts continue to be driven (to pull the media) whilst the media is clamped between the free-running roller and the clamp roller for cutting, and to avoid tearing of the media by the force applied by the driven belts, it is preferred for the belts to be passed over swinging rollers that are configured to swing against a spring bias towards the TPC component whilst the media is clamped. The advantage of this arrangement is that as soon as the clamped media is released the spring bias suddenly accelerates the cut sections of media away from the cutter blade and on into the processing section of the printer.

Thus there has herein been described a component for an optical printer, which component is configured and arranged to define a plurality of printing channels through each of which discrete lengths of media may be passed for exposure by an optical light source, the component being configurable so that discrete lengths of media may be passed through more than one of said channels for exposure by said light source to enable the formation of an image on each length of media, or so that a single length of media may be passed simultaneously through more than one of said channels for exposure by said light source to enable the formation of a single image on said single length of media.

There has also been described a component for an optical printer, which component has at least two printing channels through which discrete lengths of media may simultaneously be passed, and at least one optical printing head configured to expose lengths of media in each said channel to enable the formation of an image on each length of media.

As mentioned earlier, it will be understood by those persons skilled in the art, that whilst several preferred arrangements have been described above in detail, the scope of the present disclosure is not limited solely to the particular arrangements described. Rather the scope of the present disclosure includes any and all modifications to those embodiments which fall within the spirit and teachings of the foregoing.

For example, it may be the case that for some applications it is not necessary to provide a lens assembly in the printing head assembly. It is also the case that the printing head may comprise multiple illumination devices. In another modification of the above described arrangements, it is particularly preferred for the print head assembly to move over a vacuum table and the photographic medium to be passed therebetween, The vacuum table is advantageous as it gently holds the media substantially flat to the table and this avoids aberrations in the image that might otherwise occur if the media were to be slightly curved. In another modification, the printer may comprise more than two print heads, printing assemblies or be configurable to provide more than two channels.

It will also be apparent to persons skilled in the art, that the benefits associated with linearly offsetting the arrays (i.e. in a direction parallel to the notional lines) from one another may be enjoyed independently of the benefits associated with offsetting adjacent light source elements in a given array from one another. That is to say, the arrays may each comprise a simple column of elements (as depicted in FIG. 2(a)), with adjacent arrays being offset from one another in the manner depicted in FIG. 4 or 5.

Lastly, it should also be noted that the scope of the present invention encompasses any combination of features herein described or claimed, irrespective of whether that particular combination has been identified in the accompanying claims at this time.

The invention claimed is:

1. An illumination device for an optical printer, the illumination device comprising:
a first array of light sources comprising a plurality of light source elements that are each operable to emit light within a red band of the visible electromagnetic spectrum,
a second array of light sources comprising a plurality of light source elements that are each operable to emit light within a blue band of the visible electromagnetic spectrum; and
a third array of light sources comprising a plurality of light source elements that are each operable to emit light within a green band of the visible electromagnetic spectrum;
wherein said first, second and third arrays of light sources are generally linearly arranged along respective substantially parallel notional lines on a substrate; said first, second and third arrays of light sources are each operable to emit a strip of light, and a predetermined number of light source elements at one or both ends of each said array are arranged not to be energised so that when said light source arrays are energised a first of said arrays of light source elements emits a strip of light that is linearly offset along the associated notional line from a strip of light emitted by a second adjacent one of said arrays of light source elements.

2. An illumination device according to claim 1, wherein said plurality of light source elements of each said array are arranged such that respective adjacent light source elements of said plurality are offset from one another with respect to the associated notional line.

3. An illumination device according to claim 2, wherein respective adjacent light source elements of said plurality are offset from one another to either side of the associated notional line.

4. An illumination device according to claim 3, wherein each said light source element has a light intensity emission profile, and respective adjacent light source elements of a said array are arranged such that the light intensity emission profile of a first source element overlaps that of a second source element to such a degree that elements of an image printed by said optical printer on a photographic medium and attributable to said first and second source elements are not resolvable.

5. An illumination device according to claim 1, comprising electrical circuitry for coupling each said light source element of respective arrays of light sources to a power source and control means for energising said light source elements.

6. An illumination device according to claim 5, wherein said electrical circuitry is printed on a first side of a substrate and said light source elements are mounted on a second opposite side of said substrate, said light source elements being connected to said electrical circuitry by respective electrical pathways passing through said substrate.

7. An illumination device according to claim 6, wherein said electrical circuitry is configured to enable each of said first, second and third arrays to be individually energised.

8. An illumination device according to claim 6, wherein said substrate is configured so as to reduce light reflection between adjacent arrays of light source elements.

9. An illumination device according to claim 8, wherein said substrate is configured so as to reduce light reflection between adjacent light source elements in a said array.

10. An illumination device according to claim 9, wherein said substrate is rendered substantially non-reflective, at least on a side thereof on which said light source elements are mounted.

11. An illumination device according to claim 6, comprising one or more optical filters arranged for illumination by one or more of said arrays of light source elements so that the light emanating from said illumination device has predetermined properties.

12. An illumination device according to claim 11, comprising a plurality of filters, wherein one or more of said filters is less optically transmissive than one or more other said filters so as to reduce the relative intensity of a component of the light emanating from the illumination device that is attributable to the array of light source elements associated with said less transmissive filter.

13. An illumination device according to claim 6, comprising one or more components that are configured to reduce optical cross-talk between adjacent elements of each said array.

14. An illumination device according to claim 13, wherein said one or more components comprise a mask having a plurality of apertures provided therein, said apertures being arranged so as to be generally coincident with a said light element when said mask is located in front of said arrays of light source elements.

15. An illumination device according to claim 1, wherein said light source elements comprise light emitting diodes.

16. A printing head comprising:
an illumination device according to claim 1, and
an optic fibre light pipe having a light receiving face, said light pipe being arranged to receive light at said light receiving face from said light source arrays of said illumination device,
wherein said light pipe further comprises a light transmitting face for transmitting light from said light source arrays to illuminate a photographic medium, and a tapered region between the light receiving face and the light transmitting face so that the light receiving face has a substantially greater surface area than the light transmitting face.

17. A printing head according to claim 16, wherein said printing head further comprises means for reducing access for ambient light to said light receiving face of said light pipe.

18. A printing head assembly for an optical printer comprising a printing head according to claim 16, and an optical lens relay provided between said printing head and a transport surface along which a photographic medium is transported in use.

19. An illumination device for an optical printer, the illumination device comprising:
a first array of light sources comprising a plurality of light source elements that are each operable to emit light within a red band of the visible electromagnetic spectrum,
a second array of light sources comprising a plurality of light source elements that are each operable to emit light within a blue band of the visible electromagnetic spectrum; and
a third array of light sources comprising a plurality of light source elements that are each operable to emit light within a green band of the visible electromagnetic spectrum;
a substrate having a first surface on which said first, second and third light source arrays are mounted, said first surface being configured to reduce light reflection between adjacent arrays of light source elements; and
a mask having a plurality of apertures provided therein, the mask being located in front of said arrays of light source elements so that said apertures are generally coincident with the light source elements of said arrays to enable light from the arrays to travel through the mask.

* * * * *

UNITED STATES PATENT AND TRADEMARK OFFICE
CERTIFICATE OF CORRECTION

PATENT NO. : 8,446,440 B2
APPLICATION NO. : 12/302820
DATED : May 21, 2013
INVENTOR(S) : Elworthy et al.

Page 1 of 1

It is certified that error appears in the above-identified patent and that said Letters Patent is hereby corrected as shown below:

In the Claims

In column 22, line 20-21, in claim 1, delete "spectrum," and insert --spectrum;--, therefor In column 24, line 23-24, in claim 19, delete "spectrum," and insert --spectrum;--, therefor Signed and Sealed this
First Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,446,440 B2
APPLICATION NO. : 12/302820
DATED : May 21, 2013
INVENTOR(S) : Elworthy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 771 days.

Signed and Sealed this
Tenth Day of March, 2015

Michelle K. Lee
*Deputy Director of the United States Patent and Trademark Office*